US007671317B2

(12) United States Patent
Shimomura et al.

(10) Patent No.: US 7,671,317 B2
(45) Date of Patent: Mar. 2, 2010

(54) PHYSICAL QUANTITY DETECTING APPARATUS AND METHOD FOR DRIVING THE SAME

(75) Inventors: Kenichi Shimomura, Hyogo (JP); Kenji Watanabe, Osaka (JP); Yutaka Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/127,384

(22) Filed: May 27, 2008

(65) Prior Publication Data

US 2009/0026352 A1   Jan. 29, 2009

(30) Foreign Application Priority Data

Jul. 25, 2007   (JP) .............................. 2007-193040
Aug. 3, 2007   (JP) .............................. 2007-203037

(51) Int. Cl.
*H04N 5/335* (2006.01)
(52) U.S. Cl. .................... 250/208.1; 348/308
(58) Field of Classification Search ............. 250/214 R, 250/208.1; 348/308, 241
See application file for complete search history.

(56) References Cited

U.S. PATENT DOCUMENTS

| 5,877,715 | A | 3/1999 | Gowda et al. |
| 6,459,426 | B1 * | 10/2002 | Eglit et al. ................... 345/213 |
| 6,498,576 | B1 * | 12/2002 | Tian et al. .................... 341/155 |
| 6,518,910 | B2 * | 2/2003 | Sakuragi et al. ............. 341/162 |
| 6,660,989 | B2 * | 12/2003 | Guo et al. ................. 250/208.1 |
| 6,937,279 | B1 * | 8/2005 | Kim et al. ................... 348/308 |
| 7,218,260 | B2 * | 5/2007 | Lim ............................ 341/122 |

FOREIGN PATENT DOCUMENTS

| JP | 2005-323331 | 11/2005 |
| JP | 2005-347931 | 12/2005 |

* cited by examiner

*Primary Examiner*—Seung C Sohn
(74) *Attorney, Agent, or Firm*—McDermott Will & Emery LLP

(57) ABSTRACT

In a solid state imaging device to be included in an imaging device such as a digital camera, a ramp run-up AD conversion circuit for AD converting a pixel signal is provided corresponding to one or a plurality of pixel columns. A column counter provided in each ramp run-up AD conversion circuit holds an upper bit, and a clock signal is supplied to one or plural latches for holding a lower bit. Thus, fast and accurate AD conversion can be realized while suppressing increase of clock frequency.

16 Claims, 27 Drawing Sheets

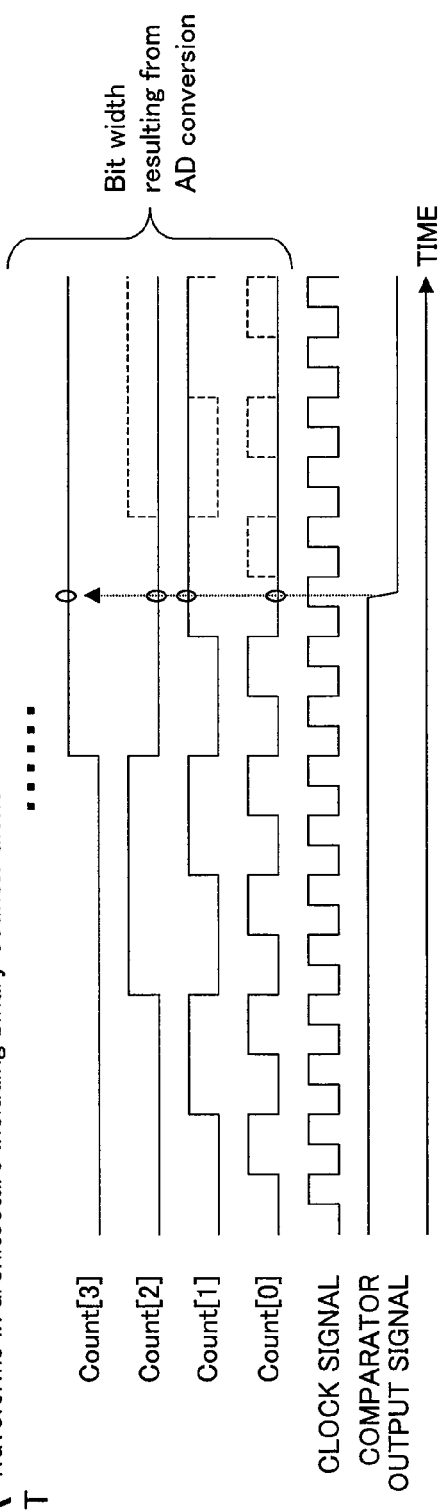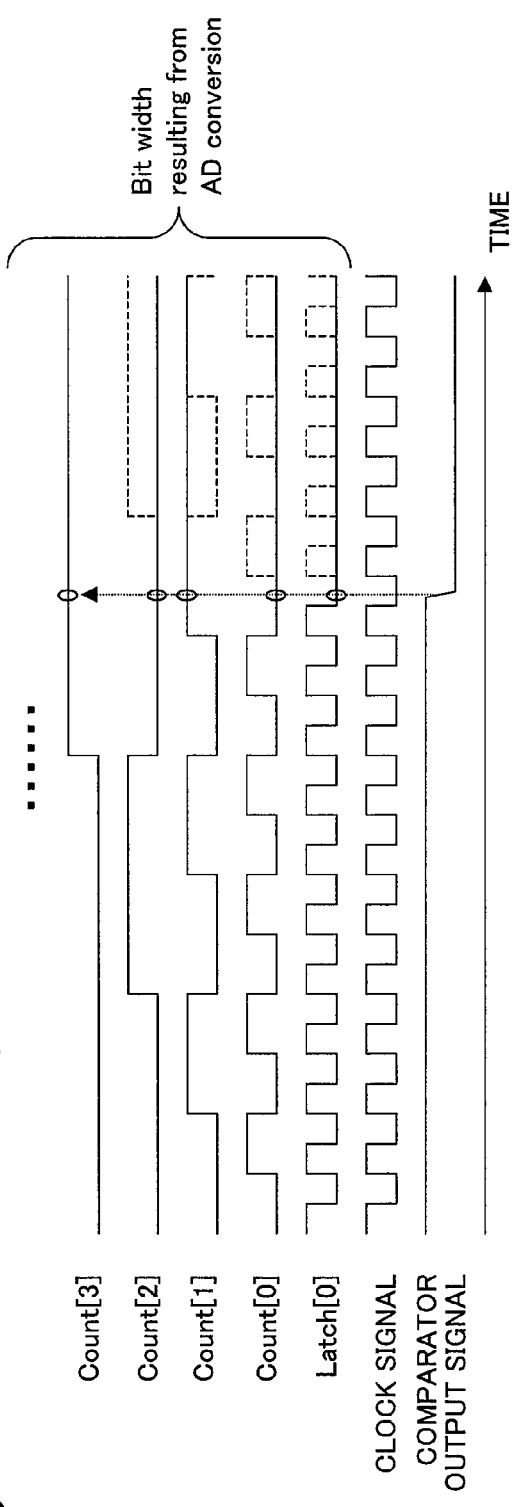

CIRCUIT CONFIGURATION

OPERATION WAVEFORMS

CIRCUIT CONFIGURATION

OPERATION WAVEFORMS

CIRCUIT CONFIGURATION OF DLL

CIRCUIT CONFIGURATION OF DELAY SECTION

FIG.15A  When m = 2
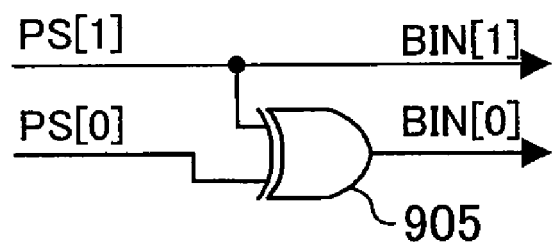
FIG.15B  When m = 3
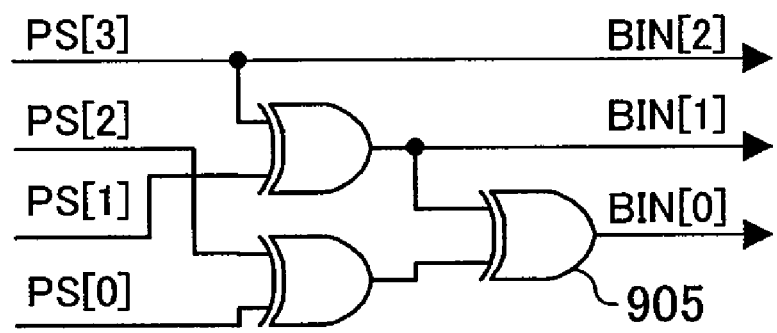

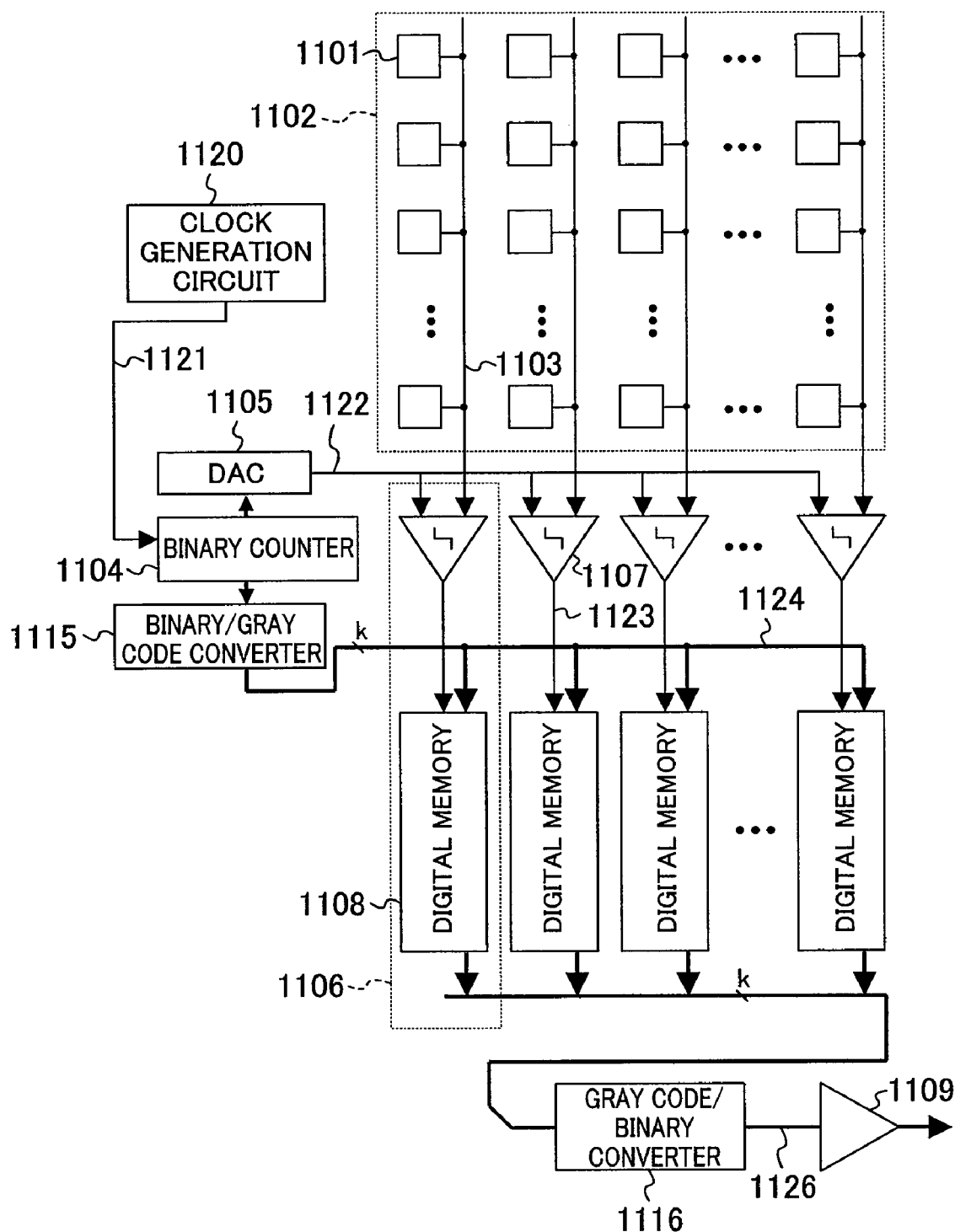

Distance from driver and clock waveform

At frequency f (cycle T)

At frequency 2f (cycle T/2)

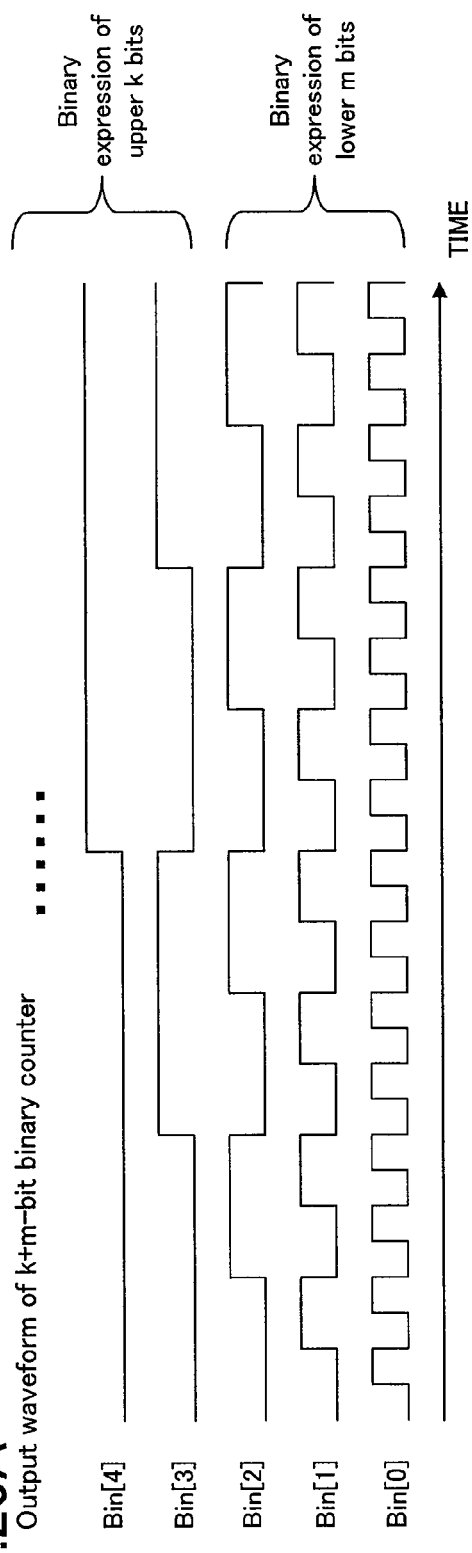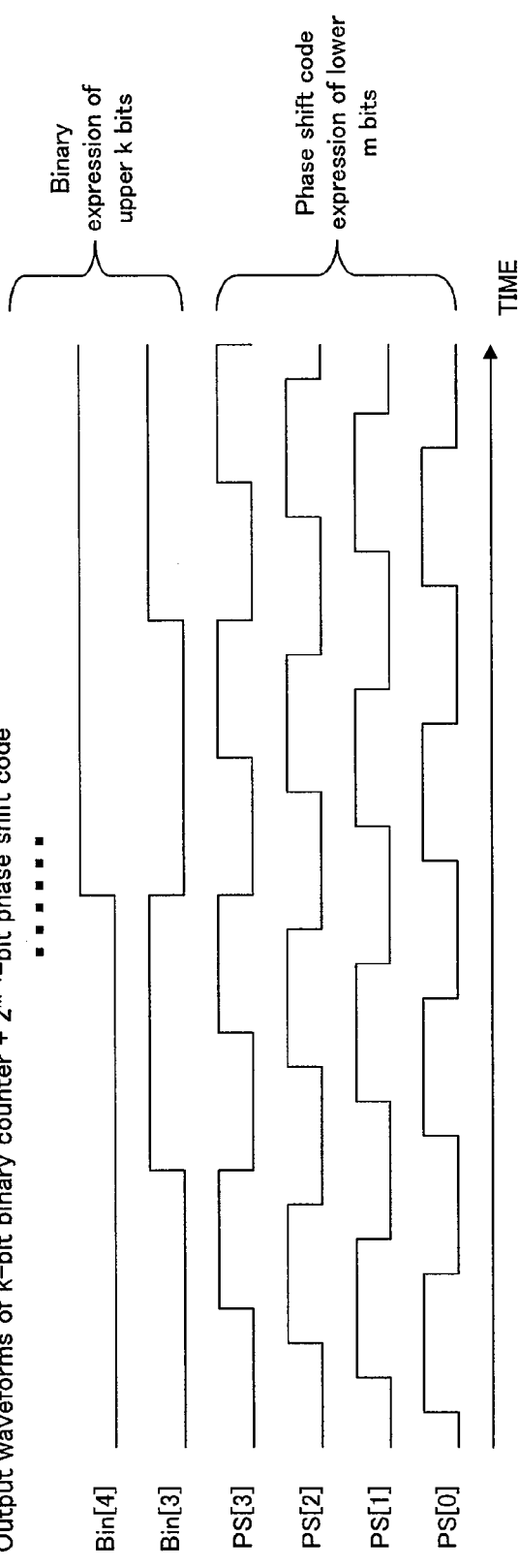

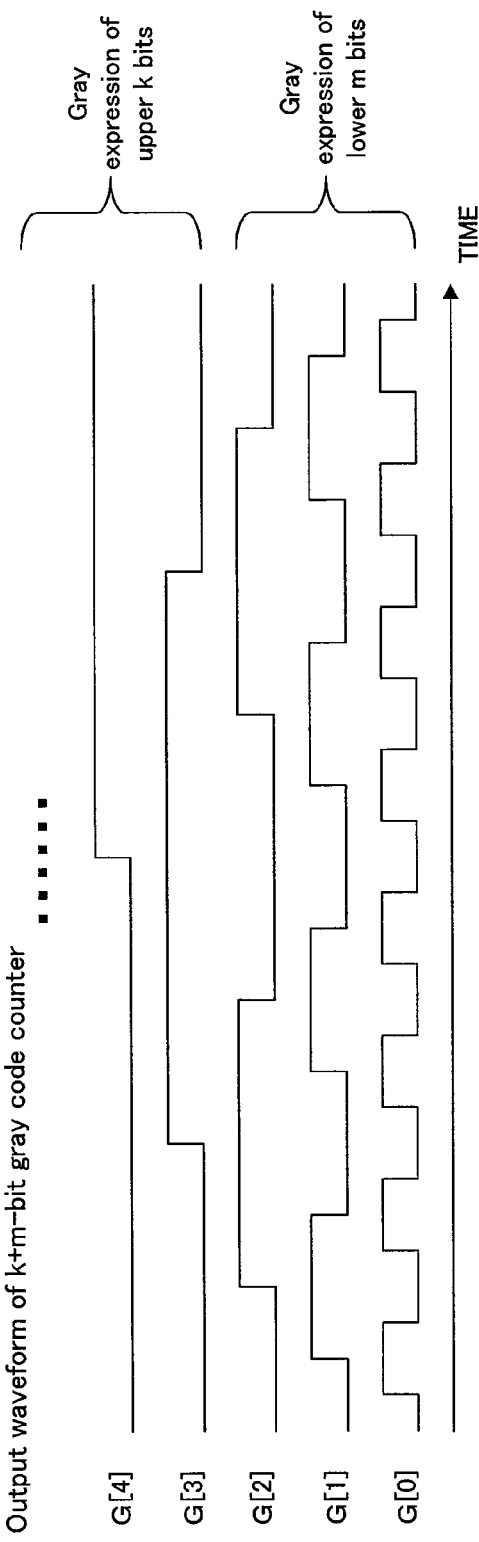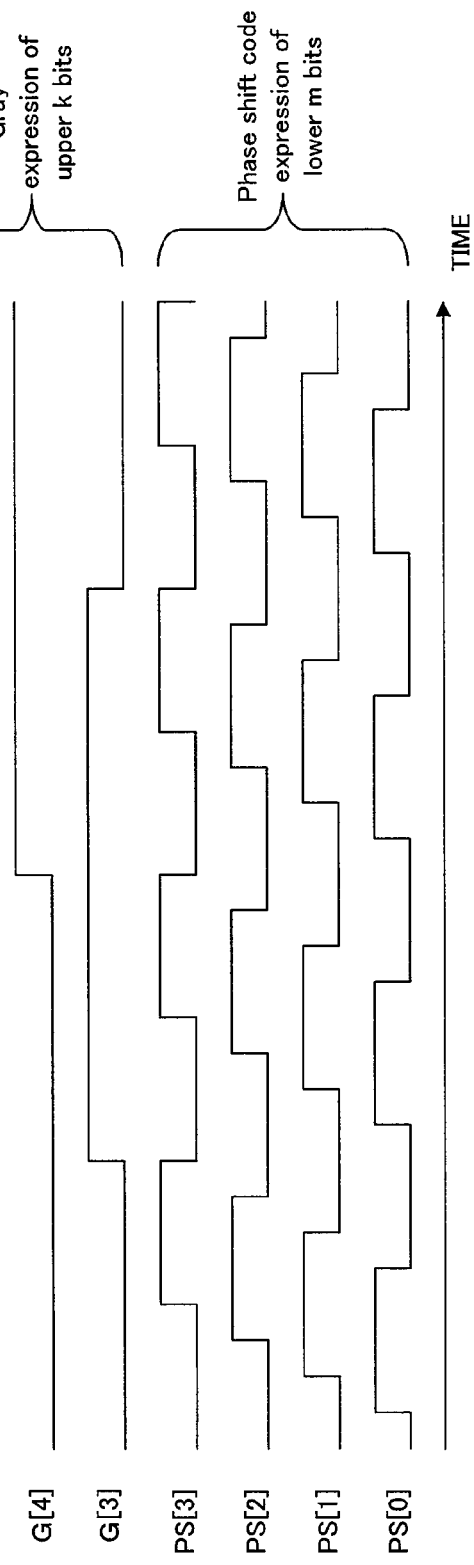

CIRCUIT CONFIGURATION

OPERATION WAVEFORMS

CIRCUIT CONFIGURATION

OPERATION WAVEFORMS

CIRCUIT CONFIGURATION OF DLL

CIRCUIT CONFIGURATION OF DELAY SECTION

FIG.28A  When m = 2
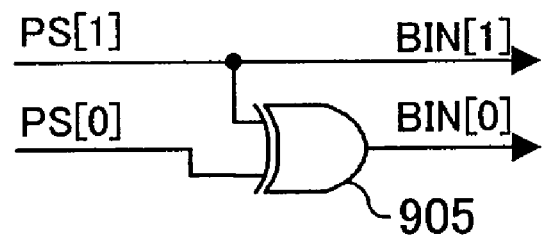
FIG.28B  When m = 3
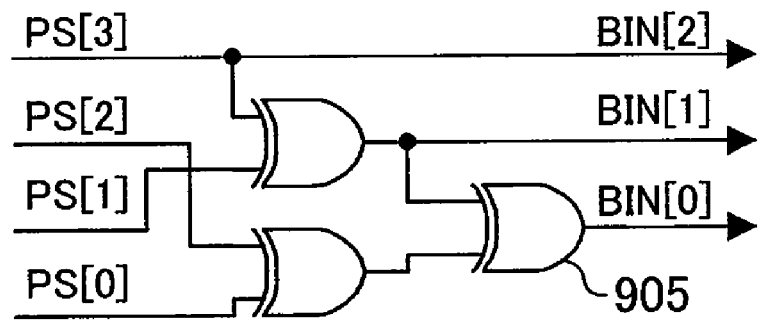

PHYSICAL QUANTITY DETECTING APPARATUS AND METHOD FOR DRIVING THE SAME

BACKGROUND OF THE INVENTION

The present invention relates to a two-dimensional physical quantity detecting apparatus for detecting a physical quantity distribution of electromagnetic waves including visible or invisible light, particle radiations such as alpha rays or beta rays, and more particularly, it relates to a solid state imaging device and a solid state imaging system including sensing elements such as photoelectric conversion elements arranged in the form of a matrix and an AD conversion circuit for receiving an output signal from the sensing elements.

In addition to a CCD (charge coupled device) type sensor (hereinafter referred to as a "CCD sensor") conventionally mainly used as an image sensor, a MOS type image sensor (hereinafter referred to as a "MOS sensor") utilizing standard process technology for a logic LSI is widely commercially available in these days. As a characteristic of a MOS sensor, a variety of analog circuits and digital circuits can be integrated on the same substrate as a pixel array, which is different from a CCD sensor. In using a CCD sensor, a digital output can be obtained only by using additional chip having an AD conversion function, such as an analog front end processor (AFE) specialized in an analog signal amplification function and an AD conversion function, or a digital signal processor (DSP) having the function of an AFE, is connected to the CCD sensor output. In contrast, a MOS sensor in which an AD conversion circuit and a pixel array are together integrated on the same chip has been already commercialized.

For an AD conversion circuit included in a MOS sensor, various conversion systems including a pipeline AD conversion system widely employed in an AFE, a column AD conversion system for AD converting pixel data of one line simultaneously in parallel and a system for AD converting all pixel data simultaneously in parallel have been proposed. With respect to the column AD conversion system, various architectures have been proposed in, for example, Japanese Laid-Open Patent Publication No. 2005-347931, U.S. Pat. No. 5,877,715 and Japanese Laid-Open Patent Publication No. 2005-323331.

FIG. 16 is a diagram for showing the architecture of a MOS sensor according to Conventional Example 1 disclosed in Japanese Laid-Open Patent Publication No. 2005-347931.

The MOS sensor of Conventional Example 1 includes a column AD conversion circuit 1106 including a comparator 1107 and a digital memory 1108 corresponding to each column of pixels 1101. A binary value output from a binary counter 1104 is input to a DA conversion circuit (hereinafter referred to as the DAC) 1105. The DAC 1105 generates an analog ramp voltage (triangle wave) 1122 according to the input binary value and outputs the analog ramp voltage 1122 to the comparator 1107 as a reference potential. The output of the binary counter 1104 is also input to a binary/Gray code converter 1115 to be converted into a Gray code, which is distributed to the digital memories 1108 of all the columns. A pixel signal is input from the pixel 1101 through a read signal line 1103 to another input port of the comparator 1107 of each column AD conversion circuit 1106.

Next, the AD conversion operation of the MOS sensor of Comparative Example 1 will be described. First, in synchronization with a clock signal 1121 input from a clock generation circuit 1120, the binary counter 1104 starts counting from the initial value and at the same time, the DAC 1105 starts generating the analog ramp voltage 1122. Then, a signal read from the pixel 1101 of each column and the common analog ramp voltage 1122 varied in synchronization with a counter value of the binary counter 1104 are input to the comparator 1107 of each column. In parallel, the counter value of the binary counter 1104 is converted into a Gray code counter value 1124 by the binary/Gray code converter 1115 so as to be distributed to the digital memories 1108. When the relationship in amplitude between the two input signals to the comparator 1107 of a given column is changed, the output signal of this comparator 1107 is inverted, and the digital memory 1108 of this column holds the Gray code counter value 1124 output from the binary/Gray code converter 1115. Since the analog ramp voltage 1122 input to the comparator 1107 and the Gray code counter value 1124 input to the digital memory 1108 are synchronized with each other through the binary counter 1104, the read signal (i.e., an analog signal) from the pixel is AD converted into the value held by the digital memory (i.e., a digital signal) through this operation.

In this manner, in the MOS sensor according to Conventional Example 1 disclosed in Japanese Laid-Open Patent Publication No. 2005-347931, a Gray code is employed as a method for expressing a digital value supplied to a digital memory. Therefore, the Gray code counter value 1124 always changes with the minimum Hamming distance of "1", and hence, even when skew is caused between bits distributed as a clock, a sampling error can be reduced. Furthermore, in successive counter values of the Gray code, merely one of the all bits is inverted, and hence, noise is suppressed. Moreover, power consumption can be reduced.

FIG. 17 is a diagram for showing the common concept of the architecture of a MOS sensor according to Conventional Example 2 disclosed in U.S. Pat. No. 5,877,715 and Japanese Laid-Open Patent Publication No. 2005-323331. The architecture of the MOS sensor according to Conventional Example 2 including another type of column AD conversion circuit will be described with reference to this drawing.

The MOS sensor according to Conventional Example 2 includes a column AD conversion circuit 1106 including a comparator 1107 and a column counter 1208 corresponding to each column of pixels 1101. A clock generation circuit 1120 supplies a clock signal 1121 not only to a binary counter 1104 but also to the column counter 1208 included in the column AD conversion circuit 1106. A binary value output from the binary counter 1104 is input to a DA conversion circuit (DAC) 1105, and the DAC 1105 generates an analog ramp voltage (triangle wave) 1122 in accordance with the input binary value. The analog ramp voltage 1122 is input to the comparator 1107 as a reference potential. A pixel signal is input from the pixel 1101 through a read signal line 1103 to another input port of the comparator 1107.

In the MOS sensor of Conventional Example 2 shown in FIG. 17, signals supplied to an array of the column AD conversion circuits to generate a resultant digital value are reduced to a single clock signal 1121 generated by the clock generation circuit 1120.

Next, the AD conversion operation of the MOS sensor of Conventional Example 2 will be described.

First, the column counter 1208 included in the column AD conversion circuit 1106 and the binary counter 1104 are initialized in accordance with an initialization signal (not shown), and an initial value of the analog ramp voltage 1122 is supplied from the DAC 1105 to one input port of the comparator 1107. Next, a pixel signal is read from a pixel 1101 of a selected row to be supplied to the other input port of the comparator 1107. After that, the clock signal 1121 is started to be input to the binary counter 1104 and the column counter 1208, so that the binary counter 1104 can start counting from the initial value. Then, the DAC 1105 also starts generating the analog ramp voltage 1122 from the initial value in accordance with the counter value of the binary counter 1104. Also, the column counter 1208 included in the column AD conversion circuit 1106 starts counting clock signals 1121 input thereto.

Subsequently, when the relationship in amplitude between the two signals input to the comparator 1107 of a given column is changed and the output signal of this comparator 1107 is inverted, the clock signal 1121 to be input to the column counter 1208 of this column is masked, and hence, the column counter 1208 holds a current counter value. Since the analog ramp voltage 1122 and the counter value of the column counter 1208 are synchronized with each other in accordance with the clock signal 1121, the read signal from the pixel (i.e., an analog signal) is AD converted into the value held by the digital memory (i.e., a digital signal) through this operation.

The aforementioned two AD conversion systems are of a kind of the column AD conversion system designated as ramp run-up ADC, and in accordance with general classification of AD conversion, these systems are designated as counting ADC. These systems are thus designated because the use of a triangle wave as a reference potential is equivalent to conversion of an analog signal potential of a pixel into a time length and the time length is measured by using a clock signal of a certain fixed frequency for the AD conversion.

The AD conversion of 10 bits, for example, requires to count the number of tones of 10 bits (namely, 1024) in comparing a signal obtained from a pixel with a reference potential (an analog ramp voltage) generated by a DAC. In the case where merely one signal is obtained from the pixel to be AD-converted at a time, the AD conversion can be completed when the relationship in amplitude between the signal potential and the reference potential is inverted, and there is no need to perform further comparison. However, in the case where pixels of, for example, one row are subjected to the AD conversion in parallel as in an AD conversion circuit included in a MOS sensor, it cannot be confirmed whether or not the conversion has been completed with respect to all the pixels by a general architecture, and therefore, the comparison should be performed 1024 times after all.

At this point, a camera provided in a cellular phone is assumed as a specific exemplified product. Even cellular phones have recently employed the mega class number of pixels and need specifications of, for example, five million pixels and a frame rate of 15 frames/sec.

For the sake of simplification, it is assumed that the aspect ratio of a pixel array of five million pixels is 2000 rows by 2500 columns, and for further simplification, it is assumed that there is no blanking period. In this case, a reading period for one row is 15 frames/sec×2000 rows/frame=30 Kline/sec. In other words, the reading rate for one row is 30 KHz.

When the "ramp run-up ADC" is applied to this product, it is necessary to perform, for 10-bit AD conversion, the comparison the number of times corresponding to the number of tones, that is, 2¹⁰=1024 times, in the reading period for one row. Thus, it is necessary to change the counter value of a counter to be output to a digital memory at a rate approximately 1000 times as large as the reading rate for one row, namely, approximately 30 MHz.

In this calculation, no consideration is paid to periods when the comparison for the AD conversion cannot be performed, namely, a waiting period in which the AD conversion circuit receives data from the pixels and a transfer time in which the result of the AD conversion is transferred to an output memory. Furthermore, apart from the above-described number of pixels, an OB (optical black) pixel period and a blanking period are not considered. Therefore, the actual frequency is higher than the above estimated frequency (and is, for example, approximately 50 MHz).

SUMMARY OF THE INVENTION

Not only in the ramp run-up ADC but also in the column AD conversion in which pixels of one row are simultaneously subjected to the AD conversion, an AD conversion rate is determined as follows:

Conversion rate=(frame rate)×(number of rows of one frame)

At this point, the "number of rows of one frame" includes not only a period when effective pixels are actually read but also a period for reading a signal from an OB pixel and a blanking period.

The number of rows of one frame substantially corresponds to a square root of the number of pixels, and the number of pixels has been recently remarkably increasing in the field of digital still cameras (DSCs) as is well known. Also, there is increasing needs of dynamic image recording in the DSCs, and the number of pixels and the frame rate tend to increase. Accordingly, it can be said, on the basis of the aforementioned formula, that the conversion rate of the column AD conversion also tends to increase.

The number of comparisons performed in unit time (namely, the number of changes of a counter value to be distributed to digital memories; hereinafter referred to as the comparison frequency) in a column and counting type AD conversion circuit such as a ramp run-up AD conversion circuit has the following relationships with the number of tones and the conversion rate of the AD conversion:

Comparison frequency=(number of tones)/[{1/(conversion rate)}−υ]

Number of tones=$2^{(conversion\ bit\ width)}$ wherein υ is a period when the comparison in the AD conversion cannot be performed. When the value υ is approximated to zero, the following simple relationship is obtained:

Comparison frequency=(number of tones)×(conversion rate)

In other words, the ramp run-up AD conversion circuit has a characteristic that the comparison frequency for the conversion is doubled as the conversion bit width is increased by 1 bit.

For example, the influence on the comparison frequency of the AD conversion in the aforementioned image sensor with five million pixels is the same in the case where the AD conversion bit width of 10 bits is increased to 11 bits and in the case where the number of pixels is increased by four times from five million to twenty million.

However, from the viewpoint of improvement in picture quality, the conversion accuracy in the AD conversion is also required, and there is a latent need of a bit width of 14 bits or 16 bits.

In the case where the bit width of the AD conversion is 14 bits, the frequency of the counter to be output to the digital memories of the five million pixels described above is 16 times as large as that obtained when the bit width is 10 bits, namely, 800 MHz, and in the case where the bit width is 16 bits, the frequency is 64 times as large as that obtained when the bit width is 10 bits, namely, 3.2 GHz. Therefore, there arise problems in the distribution of the counter value signal to the digital memories.

Specifically, the following problems occur:

(1) A clock of the GHz order is very difficult to generate even within a chip;

(2) if the clock can be generated, circuits in number corresponding to the number of pixels of one row work as the line load, and in addition, the line is so long that the parasitic RC is large, and hence, it is difficult to correctly drive the digital memories in the whole region; and (3) even if a driving waveform to drive the digital memories can be attained somehow by increasing the performance of a clock driver, by driving the digital memories from both sides, by inserting a repeater, or the like, the power consumption is largely increased, and hence, such a method is not appropriate means for solving the problems. Also, when a method in which one repeater is inserted corresponding to every plural columns is employed, it is apprehended that noise may be caused in a corresponding cycle in an image. Furthermore, when repeaters are inserted corresponding to all the columns, the power consumption is further increased and the chip area is increased, and in addition, the clock is largely delayed by the repeaters, and hence it is apprehended that the ramp run-up AD conversion circuit may not perform its essential operation.

Now, the problem (2) will be described in more detail. A ramp run-up AD conversion circuit is generally provided corresponding to one column or plural columns of pixels. Accordingly, in the case where a ramp run-up AD conversion circuit is provided, for example, corresponding to every column of pixels, a clock signal to be supplied to each bit of digital memories has load corresponding to digital memories in number equal to the number of pixels disposed in one row (namely, 2500 columns in the aforementioned five million pixels). Furthermore, the length of a line depends not only on the number of pixels but also on the size of a pixel array, and since an image sensor of what is called a Leica format size has a imaging area corresponding to a 35 mm film size, the length of a line is as long as 36 mm corresponding to the lateral length of a film, and hence, the parasitic RC is considerably large.

FIG. 18A is a diagram for schematically showing the relationship between a clock signal supplied to a digital memory of a MOS sensor of the same type as Conventional Example 1 shown in FIG. 16 and the position of the digital memory, FIG. 18B is a diagram for showing clock waveforms obtained on points A and C of FIG. 18A when the clock frequency is f, and FIG. 18C is a diagram for showing clock waveforms obtained on the points A and C of FIG. 18A when the clock frequency is 2f.

As shown in FIG. 18A, as a distance from the clock generation circuit 1120 (or the binary/Gray code converter 1115) is increased as on the points A, B and C, the clock waveform becomes flatter due to a parasitic RC component. In such a case, although no problem occurs on the point A at any of the frequencies as show in FIGS. 18B and 18C, the RC load is so large on the point C that both the rise time and the fall time are largely extended. Therefore, the clock signal cannot fully swing at the frequency 2f and hence the signal amplitude is small. In this manner, as the frequency is increased for improving the conversion accuracy, there is larger possibility that a problem is caused in the AD conversion operation in a column disposed away from the supply source of the clock signal.

In Conventional Example 1 shown in FIG. 16, employment of the Gray code expression reduces the necessary switching rate (frequency) to one half of that in the case where the binary expression is employed.

However, merely by this means, the clock frequency obtained with the bit width of 14 bits is reduced to 400 MHz and that obtained with 16 bits is reduced to 1.6 GHz. Although the difficulty is slightly reduced, the aforementioned three problems still remain.

An object of the invention is providing a solid state imaging device capable of high speed processing with high picture quality even when the number of pixels, the frame rate, the conversion bit width or the like is increased.

In order to achieve the object, the present inventors have made various examinations, resulting in finding the following: latches are provided in each AD conversion circuit so as to hold clock signals or a value obtained by converting the clock signals into a Gray code or a phase shift code, and thus, lower bits of an AD converted value are expressed. In this manner, the bit width of the AD converted value can be increased without increasing the maximum frequency of the clock signals and without changing conversion time. Alternatively, in the case where the bit width of the AD converted value is not increased, the maximum frequency of the clock signals can be lowered. In particular, when the value held by the latches is expressed by using a Gray code or a phase shift code, the Hamming distance can be always suppressed to the minimum value of "1", and hence, even when there is skew between bits, the influence of a sampling error can be minimized. Furthermore, since change in a current consumed by counter value change is small, occurrence of noise can be suppressed, and the power consumption can be reduced as compared with the case where a binary code is used. In particular, when a phase shift code is used, the bit accuracy can be improved at the same frequency of a clock signal and the same processing time.

Specifically, the physical quantity detecting apparatus of this invention includes a sensitive element array in which sensitive elements for detecting physical quantity are arranged in the form of a matrix; a column AD conversion circuit provided corresponding to every column or every plurality of columns of the sensitive elements for converting a signal output from each of sensitive elements of the corresponding column(s) into a digital signal; an output signal bus for transferring the digital signal output from the column AD conversion circuit; a clock generation circuit for supplying a counter clock signal and one or plural latch clock signals to the column AD conversion circuit; and a DA converter for outputting a triangle wave, and the column AD conversion circuit includes a comparator for comparing the signal output from each of the sensitive elements in a given period with potential of the triangle wave; a column counter for counting pulses of the counter clock signal and holding a counter value obtained when an output of the comparator is changed; and one or plural latches for receiving the latch clock signals and holding a value of the latch clock signals obtained when the output of the comparator is changed, and the digital signal with amplitude in accordance with an AD converted value expressed through a combination of the counter value held by the column counter and the value held by the one or plural latches being output to the output signal bus.

Owing to the aforementioned architecture, a part of bits of the A/D converted value (lower bits in particular) can be held by the latches. Therefore, the maximum frequency of the counter clock signal to be supplied to the column counter can be lowered. Alternatively, when the frequency and the processing time are the same, bit accuracy can be largely improved as compared with that attained in a conventional physical quantity detecting apparatus. The latch clock signal(s) to be held by the latch(es) may be expressed by using a binary code, a Gray code or a phase shift code, and a Gray code or a phase shift code is preferably used. Particularly, a phase shift code is more preferably used because the bit accuracy of the AD conversion can be thus largely improved without changing the frequency of the counter clock signal and the latch clock signal.

The driving method of this invention is for a physical quantity detecting apparatus including a sensitive element array in which sensitive elements for detecting physical quantity are arranged in the form of a matrix; a column AD conversion circuit that includes a comparator, a column counter and one or plural latches and is provided corresponding to every column or every plurality of columns of the sensitive elements for converting a signal output from each of sensitive elements of the corresponding column(s) into a digital signal; an output signal bus for transferring the digital signal output from the column AD conversion circuit; a clock generation circuit for supplying a counter clock signal and s latch clock signals to the column AD conversion circuit; and a DA converter for outputting a triangle wave, and the driving method includes the steps of (a) comparing a potential of the signal read from each of the sensitive elements with a potential of the triangle wave by the comparator; (b) counting pulses of the counter clock signal by the column counter from start of comparison by the comparator; (c) holding a counter value of the column counter with the counter clock signal to be input to the column counter masked when an output from the comparator is changed after the step (b); (d) holding, by the one or plural latches, potentials of the s latch clock signals obtained when the output from the comparator is changed after the step (b); and (e) outputting a digital signal of a given voltage by the column AD conversion circuit to the output signal bus, the digital signal being obtained on the basis of a value expressed by combining the value held by the one or plural latches in the step (d) as lower m bits with the counter value of the column counter held in the step (c).

In this method, the signal read from each of the sensitive elements is AD converted by combining the counter value held by the column counter and the latch clock signal held by the latches (or a value obtained by converting the latch clock signal into a phase shift code or a Gray code). Therefore, the frequency of the clock signal can be lowered while retaining the bit accuracy of the AD conversion. Alternatively, the bit accuracy can be improved while retaining the frequency of the clock signal at a given value.

BRIEF DESCRIPTION OF THE DRAWINGS

FIG. 2A is a diagram of operation waveforms employed in a column AD conversion circuit included in a MOS sensor according to Conventional Example 2 and FIG. 2B is a diagram of operation waveforms employed in a column AD conversion circuit included in the MOS sensor of Embodiment 1.

FIGS. 15A and 15B are diagrams for showing an exemplified configuration of a $2^{m-1}$-bit phase shift code/binary converter 113 shown in FIG. 5 or 8.

FIG. 16 is a diagram for showing the architecture of a MOS sensor according to Conventional Example 1.

FIG. 20A is a diagram for showing the waveforms of a signal input to a digital memory obtained when the AD conversion of an image signal is performed by using a binary value alone and FIG. 20B is a diagram for showing the waveforms of a signal input to a digital memory obtained when the AD conversion of an image signal is performed by using both a phase shift code and a binary code (i.e., in Embodiment 5).

FIG. 22A is a diagram for showing the waveforms of a signal input to a digital memory obtained when the AD conversion of an image signal is performed by using a Gray code alone and FIG. 22B is a diagram for showing the waveforms of a signal input to a digital memory obtained when the AD conversion of an image signal is performed by using both a Gray code and a phase shift code (i.e., in Embodiment 6).

FIGS. 28A and 28B are diagrams for showing exemplified configurations of a phase shift code/binary convert of $2^{m-1}$ bits.

DETAILED DESCRIPTION OF THE INVENTION

Two-dimensional array type MOS sensors will now be described in preferred embodiments of the invention with reference to the accompanying drawings. It is noted that the embodiments described below are not restrictive and that the architecture or the driving method of this invention are widely applicable to various semiconductor devices each of which is used for detecting a physical quantity distribution and includes a plurality of unit composing elements sensitive to externally input electromagnetic waves such as light and radiant rays and arranged in the form of a line or a matrix.

In each solid state imaging device described in Embodiments 1 and 2 below, what is called a CDS (correlated double sampling) operation for subtracting a reset level read from a pixel from a signal level read from the pixel is generally performed in an analog region by using a S/H (sample and hold) capacitor, which is omitted for simplification in the following description because it is not directly related to the scope of the invention.

Embodiment 1

Figure 1:
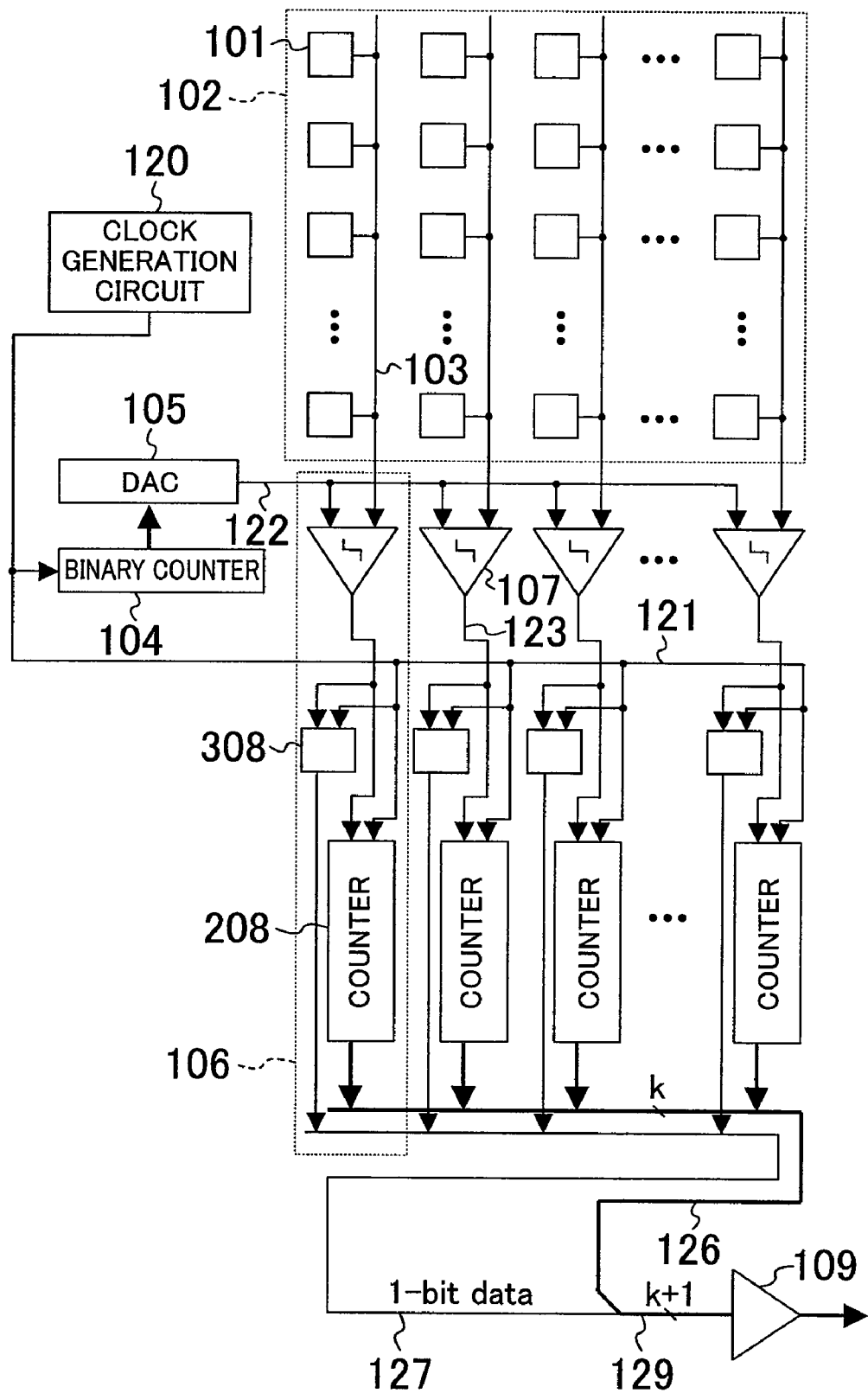
FIG. 1 is a diagram for showing the architecture of a solid state imaging device (MOS sensor) according to Embodiment 1 of the invention.

FIG. 1 is a diagram for showing the architecture of a solid state imaging device (a MOS sensor) according to Embodiment 1 of the invention.

As shown in FIG. 1, the MOS sensor of this embodiment includes a pixel array (a sensitive element array) 102 in which pixels (sensitive elements) 101 are arranged in the form of a matrix; a column AD conversion circuit 106 provided corresponding to each column or a plurality of columns of pixels 101 for converting a signal output from a pixel 101 into a digital signal; a column scanning circuit (not shown) for controlling output of a digital signal converted and held by the column AD conversion circuit 106; output signal buses 126 and 127 for transferring the digital signal output from the column AD conversion circuit 106; a clock generation circuit 120 for supplying clock signals (including a counter clock signal and a latch clock signal); a binary counter 104; a DA conversion circuit (DAC; a reference potential generation circuit) 105; and an output buffer 109 having an input port connected to the output signal buses 126 and 127. At this point, a pixel includes at least a photosensitive element such as a photodiode or a photogate, and is a unit element equipped, if necessary, with a device structure for reading a signal generated through photoelectric conversion or a structure capable of initialization. It is noted that FIG. 1 shows an exemplified architecture in which the column AD conversion circuit 106 is provided corresponding to each column of pixels.

Each column AD conversion circuit 106 includes a comparator 107, a latch 308 and a column counter 208.

The clock generation circuit 120 supplies a clock signal 121 to the binary counter 104, the column counter 208 and the latch 308. The binary counter 104 supplies a binary value to the DAC 105, and the DAC 105 generates an analog ramp voltage (a triangle wave) 122 in accordance with the input binary value. This analog ramp voltage 122 is input to the comparator 107 as a reference potential. A pixel signal read from the pixel 101 through a read signal line 103 is input to the other input port of the comparator 107, and an output of the comparator 107 is input to the column counter 208 and the latch 308.

Figure 17:
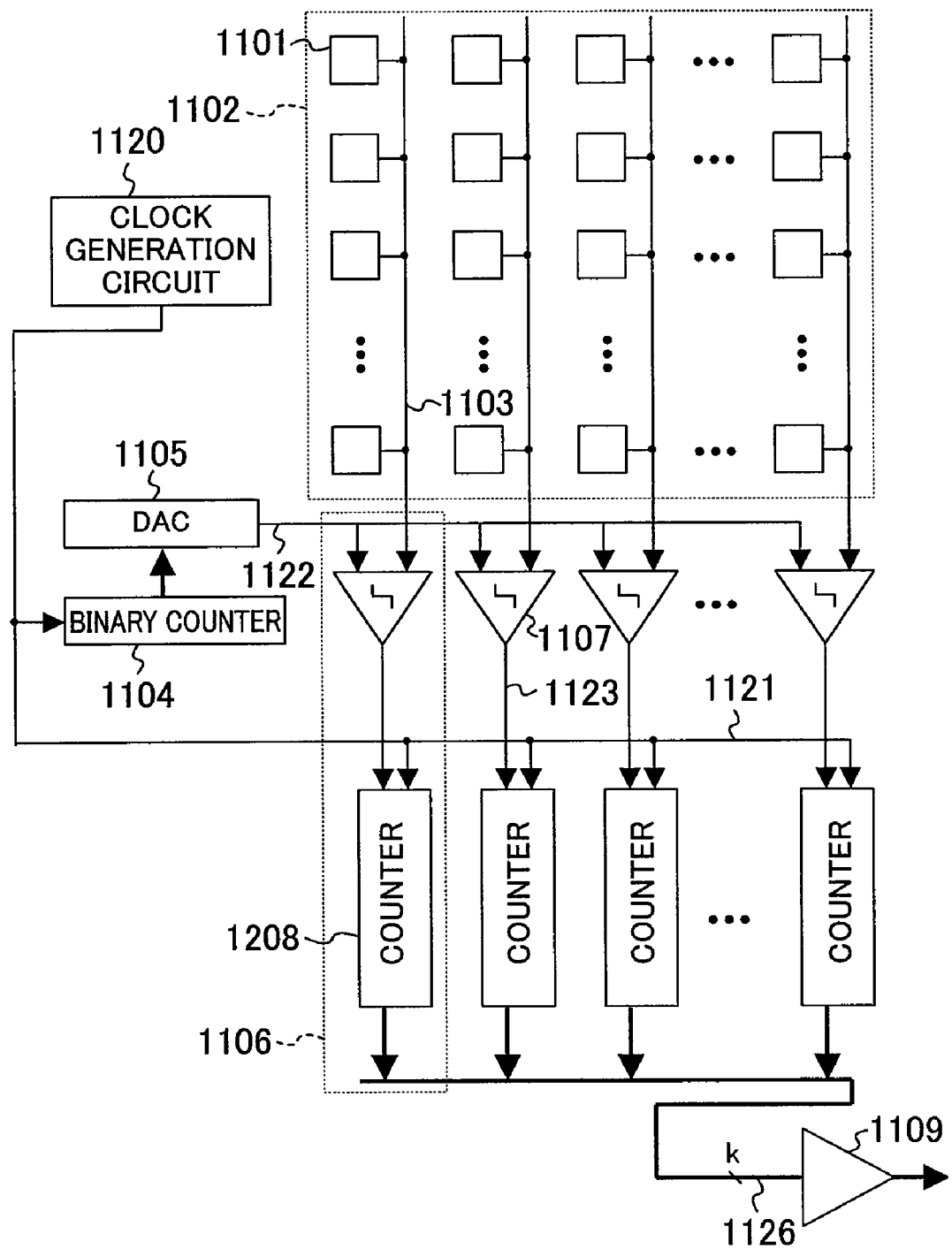
FIG. 17 is a diagram for showing the architecture of a MOS sensor according to Conventional Example 2.
Figure 18A:
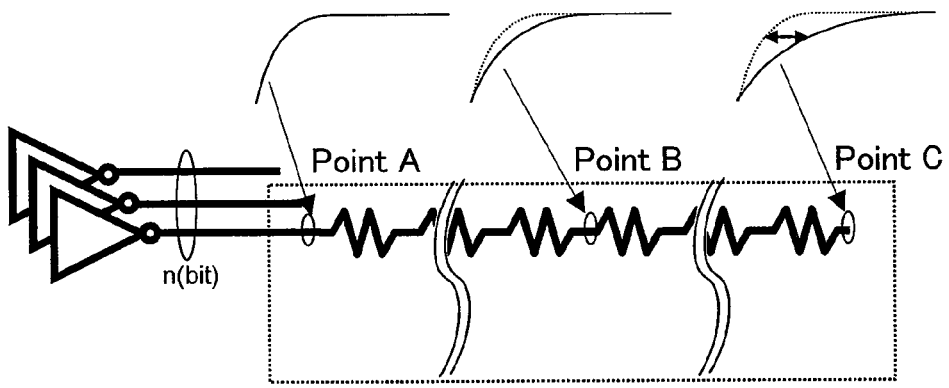
FIG. 18A is a diagram for schematically showing the relationship between a clock signal supplied to a digital memory of a MOS sensor of the same type as Conventional Example 1 and the position of the digital memory.
Figure 18B:
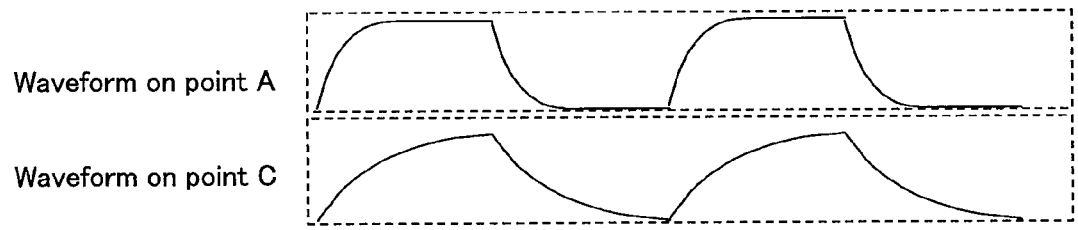
FIG. 18B is a diagram for showing clock waveforms obtained on points A and C of FIG. 18A when the clock frequency is f and FIG. 18C is a diagram for showing clock waveforms obtained on the points A and C of FIG. 18A when the clock frequency is 2f.
Figure 18C:
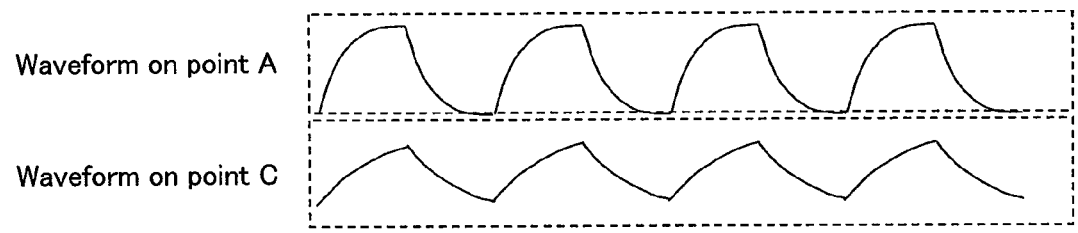

The MOS sensor of this embodiment is the same as the conventional MOS sensor shown in FIG. 17 in the column counter 208 included in the column AD conversion circuit 106 but is different from the conventional MOS sensor in the latch 308 additionally provided as a mechanism for receiving the signal output from the comparator 107 and defining a digital value.

Next, the AD conversion operation of the MOS sensor of this embodiment will be described.

First, the column counter 208 included in the column AD conversion circuit 106 and the binary counter 104 are initialized in accordance with an initialization signal (not shown), and an initial value of the analog ramp voltage 122 is supplied from the DAC 105 to one input port of the comparator 107. Subsequently, a pixel signal is read from a pixel 101 of a selected row, and the pixel signal is supplied to the other input port of the comparator 107. Under this condition, the input of the clock signal 121 from the clock generation circuit 120 is started, so that the binary counter 104 can start counting from the initial value. Then, the DAC 105 also starts generating the analog ramp voltage 122 from the initial value in accordance with the counter value of the binary counter 104. Also, at the same time, the column counter 208 included in the column AD conversion circuit 106 starts counting clock signals (counter clock signals) 121 input thereto.

Subsequently, when the relationship in amplitude between the two signals input to the comparator 107 of a given column is changed, a comparator output signal 123 is inverted. Then, the clock signal (counter clock signal) 121 to be input to the column counter 208 of this column is masked, and at the same time, the counting of the column counter 208 is stopped and the column counter 208 holds a current counter value. Similarly, when the comparator output signal 123 is inverted, the latch 308 holds the clock signal (latch clock signal) 121 as data at the same timing as the stop of the counting of the column counter 208. Since the analog ramp voltage 122 and the counter value of the column counter 208 are synchronized with each other in accordance with the clock signal 121, the signal read from the pixel 101 (i.e., an analog signal) is AD converted into the value held by the column counter 208 and the latch 308 (i.e., a digital value) through this operation. It is noted that this AD conversion operation is performed simultaneously and in parallel on pixel signals of all the columns except for a difference in the inversion timing of the comparator output signals 123 of the respective columns. After the binary counter 104 completes counting a predetermined bit width, the output from the latch 308 and the output from the column counter 208 of each column are simultaneously read by the column scanning circuit (not shown), so that the output buffer 109 can output an AD converted value.

Next, referring to FIGS. 2A and 2B, an effect attained by additionally providing the latch 308 in the column AD conversion circuit 106 will be described. FIG. 2A is a diagram for showing the operation waveforms employed in the column AD conversion circuit of the MOS sensor according to Conventional Example 2 and FIG. 2B is a diagram for showing the operation waveforms employed in the column AD conversion circuit of the MOS sensor of this embodiment. Since the comparators 107 or 1107 of the respective columns simultaneously compare the pixel signals of the corresponding columns, values held by the column counter and the latch of a specific column in which the comparator output signal is inverted are shown with solid lines and values in another column in which the signal is not inverted are shown with broken lines.

In the following description, it is assumed that the bit width of the column counter 208 is k bits, a counter value of the column counter 208 is indicated as Count[k−1:0], and a value held and output by the latch 308 is indicated as Latch[0]. FIG. 2B also shows the waveforms of the clock signal 121 and the comparator output signal 123. The column counter 208 is assumed to have a structure in which its counter value is changed at, for example, every falling edge of the clock signal 121. Also, it is assumed that the comparator output signal 123 is at H level before the relationship in amplitude between the pixel signal and the analog ramp voltage 122 is inverted and is at L level after it is inverted.

As shown in FIG. 2A, in the MOS sensor of Conventional Example 2, a counter value of the column counter obtained after the comparator output signal is inverted corresponds to a digital value resulting from the AD conversion, and the value Count[3:0] is "1010" when expressed as a binary number (see portions with circles in FIG. 2A). It is noted that an upper bit other than lower 5 bits (beyond bit4) is omitted in this drawing.

On the other hand, as shown in FIG. 2B, also in the MOS sensor of this embodiment, a counter value of the column counter 208 and an output value (a held value) of the latch 308 obtained after the comparator output signal 123 is inverted correspond to a digital value resulting from the AD conversion. However, differently from the conventional MOS sensor, not only the same value Count[3:0] but also a value Latch[0] (=1) is obtained. Therefore, when compared at the same frequency and the same conversion time, the accuracy on the lower bits can be improved without increasing the clock frequency in the MOS sensor of this embodiment. Although a value of the least significant bit is largely varied than upper bits, since the accuracy of the lower bits can be improved in the MOS sensor of this embodiment, there arises no problem in the AD conversion operation even when the number of pixels and the frame rate are increased, and thus, the degradation of picture quality is suppressed. In the case where the least significant bit is expressed by using the output of the latch 308 alone, the bit width of the AD conversion can be increased while lowering the maximum frequency of a signal to be supplied to the column counter to a half of the maximum frequency of the MOS sensor of Conventional Example 2.

The maximum frequency of data obtained as a result of the AD conversion employing the conventional column counter system is a half of the frequency of a clock signal supplied to the column counter. In the MOS sensor of this embodiment, however, a clock signal is directly dealt with as a data value to be supplied to the latch 308, so as to improve the resolution without increasing the time necessary for the AD conversion.

At this point, a case where the counter value of the column counter 208 is changed at a rising edge of the clock signal 121 will be examined.

Figure 3A:
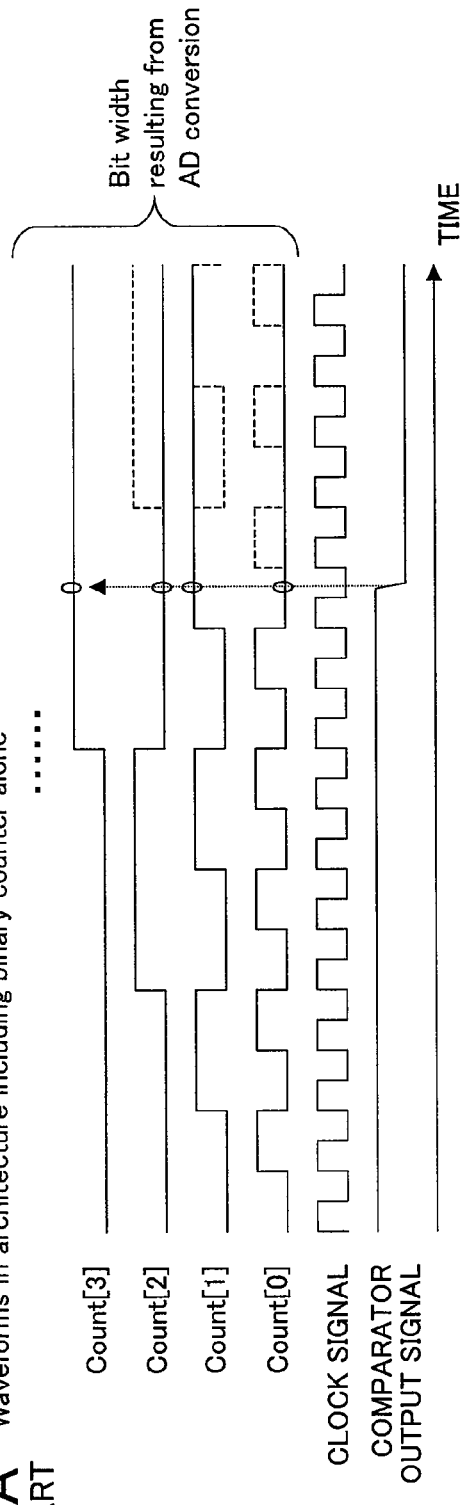
FIG. 3A is a diagram of operation waveforms employed in the column AD conversion circuit included in the MOS sensor according to Conventional Example 2 and FIG. 3B is a diagram of operation waveforms employed in the AD conversion circuit include in the MOS sensor of Embodiment 1.
Figure 3B:
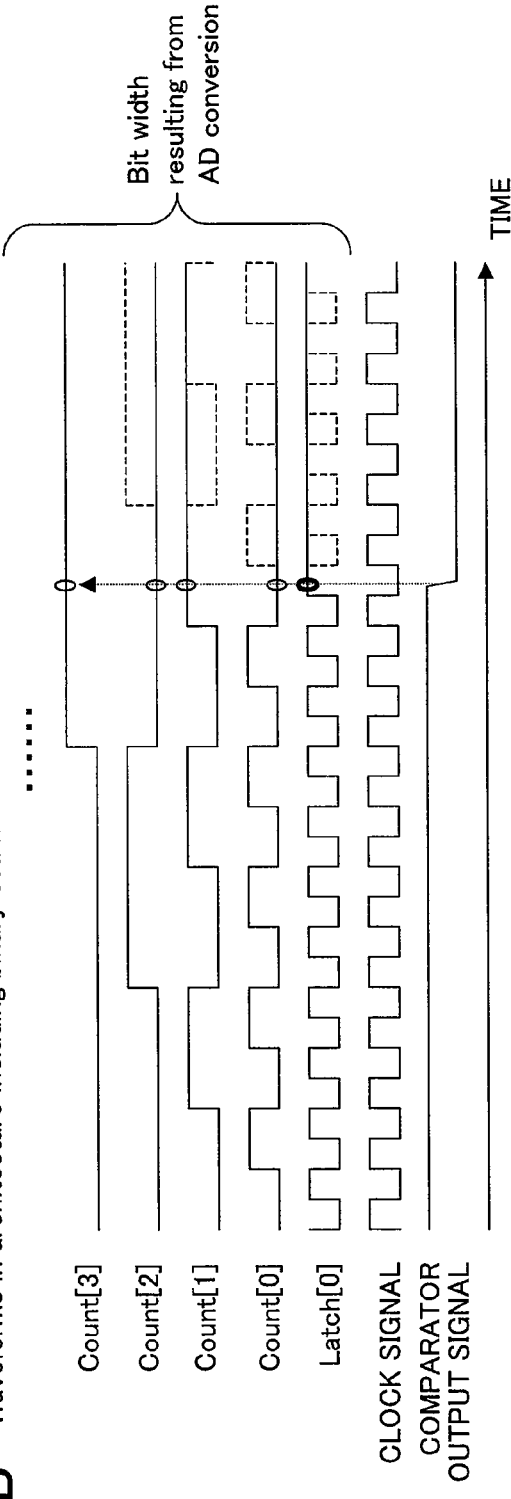

FIG. 3A is a diagram for showing operation waveforms employed in the column AD conversion circuit of the MOS sensor of Conventional Example 2 and FIG. 3B is a diagram for showing operation waveforms employed in the column AD conversion circuit of the MOS sensor of this embodiment.

As is understood from comparison between FIGS. 3A and 2A, in the MOS sensor of Conventional Example 2, the result of the AD conversion is not affected but merely the clock signal is inverted no matter whether the counter value is changed at a rising edge or a falling edge of the clock signal.

In contrast, as is understood from comparison between FIGS. 3B and 2B, in the MOS sensor of this embodiment, not only the clock signal is inverted but also the data Latch[0] is inverted between the case where the counter value is changed at a rising edge of the clock signal and the case where the counter value is changed at a falling edge. Therefore, in the case where the counter value of the column counter 208 is changed at a rising edge of the clock signal 121, 1 or 0 of the least significant bit of the result of the AD conversion is in reverse to that obtained when it is changed at a falling edge. Accordingly, in this case, the architecture of the MOS sensor of this embodiment is modified as shown in FIG. 4.

Figure 4:
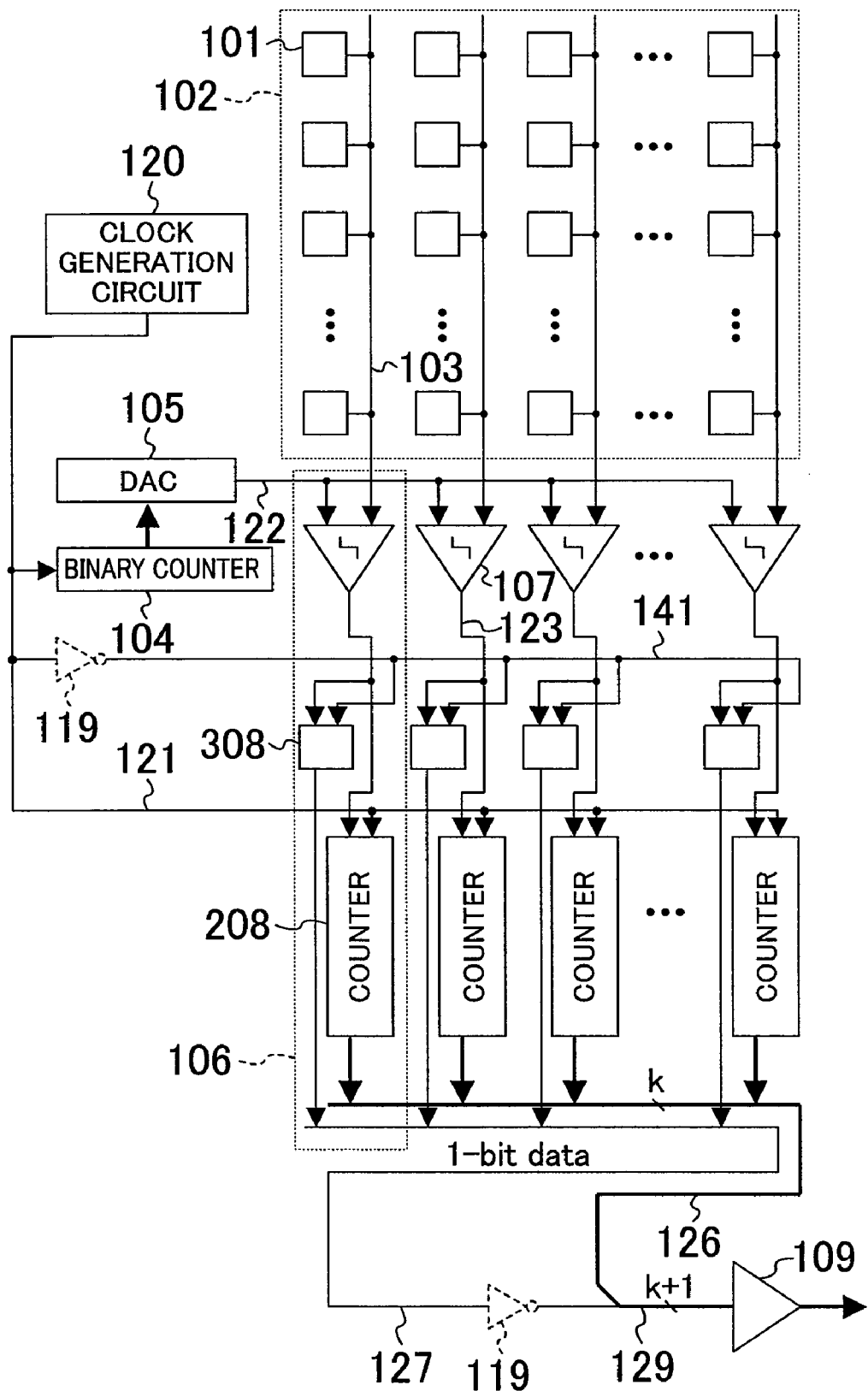
FIG. 4 is a diagram of a MOS sensor according to a modification of Embodiment 1.

FIG. 4 is a diagram for showing a modification of the MOS sensor of this embodiment. The MOS sensor of this modification has the same architecture as the MOS sensor of this embodiment shown in FIG. 1 except that an inverter 119 is inserted in one of positions shown with broken lines.

As shown in FIG. 4, in order to prevent the inversion of a value corresponding to the least significant bit, the inverter 119 is provided between the clock generation circuit 120 and the latch 308. Thus, a signal obtained by inverting the clock signal 121 (namely, an inverted clock signal 141) is input to the latch 308, and hence, the inversion of the least significant bit can be avoided.

Alternatively, the inversion of the least significant bit can be avoided by inserting the inverter 119 on the output signal bus 127 corresponding to a path for reading a signal from the latch 308. Thus, since the clock signal supplied to the column counter 208 is commonly used as the clock signal supplied to the latch, the number of signal lines used for supplying the clock signal to the latches can be reduced. Also, since merely one inverter is additionally provided in either case, the device area is minimally increased and the device can be easily fabricated.

It is noted that since all the composing elements shown in FIG. 1 can be built on one semiconductor substrate, the number of components is smaller than in a CCD sensor that performs the AD conversion outside a solid state imaging device, and hence, the size of the imaging device (such as a camera set) can be reduced.

Embodiment 2

Figure 5:
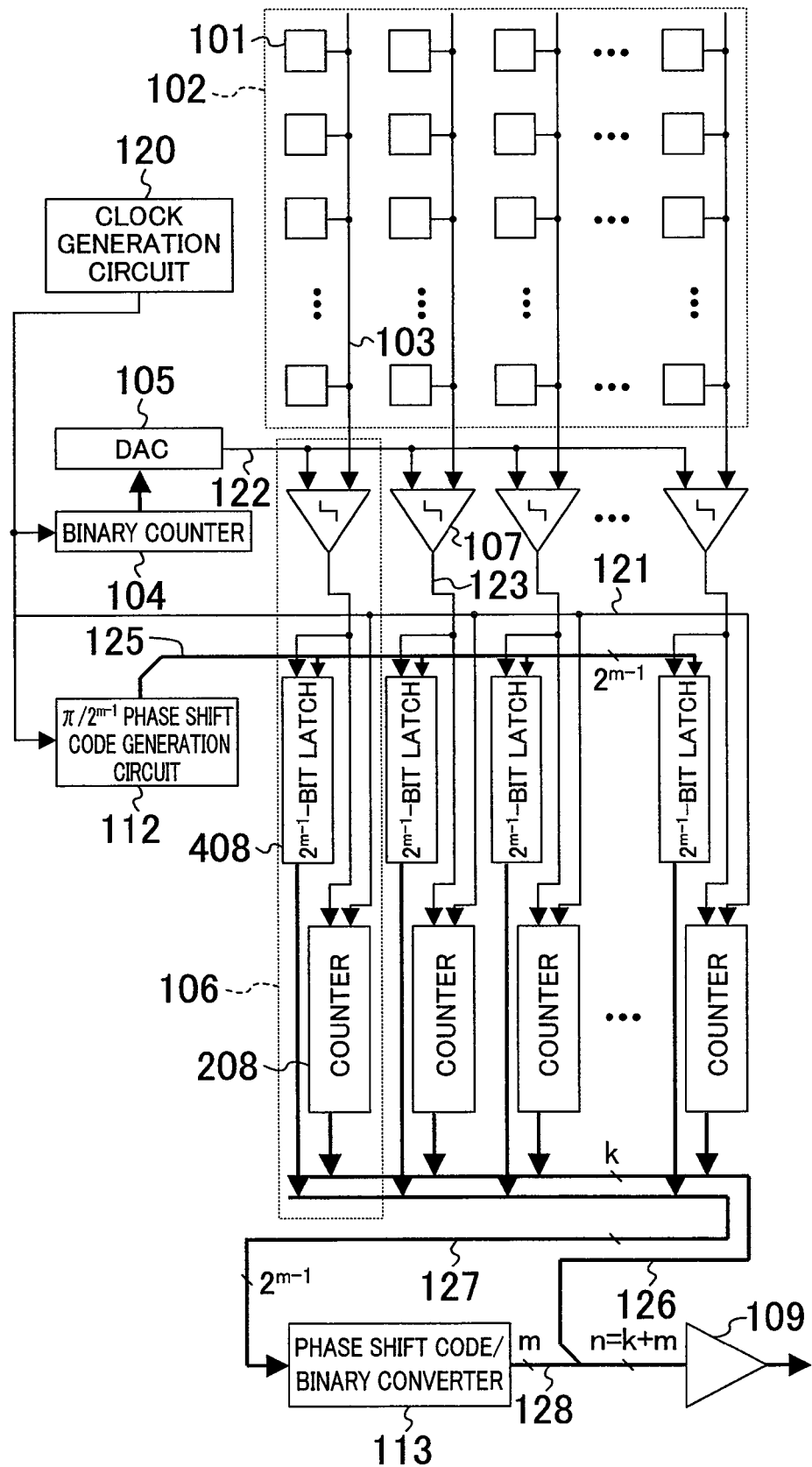
FIG. 5 is a diagram for showing the architecture of a MOS sensor according to Embodiment 2 of the invention.

FIG. 5 is a diagram for showing the architecture of a MOS sensor according to Embodiment 2 of the invention. In FIG. 5, like reference numerals are used to refer to like circuits and members included in the MOS sensor of Embodiment 1 shown in FIG. 1 so as to omit or simplify the description.

As shown in FIG. 5, the MOS sensor of this embodiment is the same as the MOS sensor of Embodiment 1 in the connection from a pixel array 102 to comparators 107. However, each column AD conversion circuit 106 of this MOS sensor is different from the column AD conversion circuit of Embodiment 1 in including not only the comparator 107 and a column counter 208 but also a $2^{m-1}$-bit latch 408. The column AD conversion circuit 106 is provided corresponding to each column in FIG. 5.

The MOS sensor of this embodiment further includes a $\pi/2^{m-1}$ phase shift code generation circuit 112 for receiving a clock signal 121 and a phase shift code/binary converter 113 provided on an output signal bus 128 for transferring an output signal of the $2^{m-1}$-bit latch 408. The $\pi/2^{m-1}$ phase shift code generation circuit 112 outputs m clock signals (latch clock signals) respectively shifted in phase by $\pi/2^{m-1}$.

A clock generation circuit 120 supplies the clock signal 121 not only to a binary counter 104 but also to the column counter 208 and the $2^{m-1}$-bit latch 408 included in the column AD conversion circuit 106.

A binary value output from the binary counter 104 is input to a DAC 105, and the DAC 105 generates an analog ramp voltage (a triangle wave) 122 in accordance with the input binary value. The analog ramp voltage 122 is input to one input port of the comparator 107 as a reference potential. A pixel signal read from a pixel 101 through a read signal line 103 is input to the other input port of the comparator 107. An output of the comparator 107 is input to the column counter 208 and the $2^{m-1}$-bit latch 408.

In this manner, the MOS sensor of this embodiment is characterized by including the $2^{m-1}$-bit latch 408 receiving, as an input, a value converted to a phase shift code and the phase shift code/binary converter 113 for restoring an output signal from the $2^{m-1}$-bit latch 408 to a binary value. It is noted that a "phase shift code" herein means a binary number in which merely one bit is changed when increased/reduced by 1 and is a code in which bits are successively changed one by one from a lower bit to a higher bit as the value is increased. In other words, in a phase shift code obtained on the assumption that the bit width is P, the number of 1 is successively increased in such a manner that "all bits being 0", "the least significant bit alone being 1", "two lower bits being 11", etc., and when all the bits become 1, the number of 0 is successively increased this time in such a manner that "the least significant bit alone being 0", "two lower bits being 00", etc., resulting in returning to "all bits being 0". Accordingly, by using a phase shift code, 2P kinds of distinctions can be made. For example, when P=4, the following expressions can be obtained by using the phase shift code:

0: 0000
1: 0001
2: 0011
3: 0111
4: 1111
5: 1110
6: 1100
7: 1000
8: 0000

Figure 6:
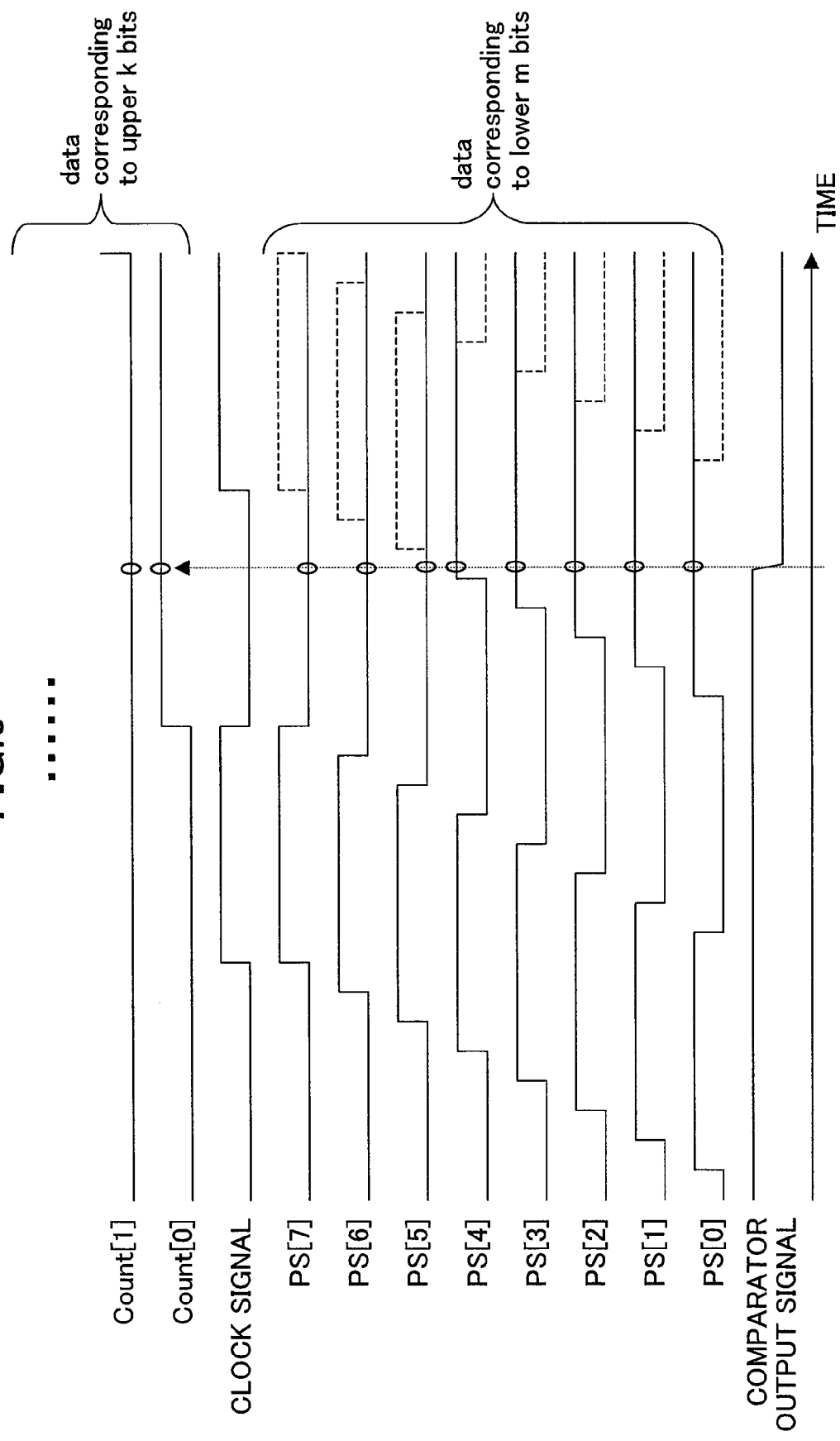
FIG. 6 is a waveform diagram obtained by replacing lower 4 bits of an AD converted value with a phase shift code in the MOS sensor of Embodiment 2.

FIG. 6 is a waveform diagram obtained in the MOS sensor of this embodiment when lower 4 bits of an AD converted value are replaced with a phase shift code. As is understood from FIG. 6, the $\pi/2^{m-1}$ phase shift code generation circuit 112 supplies, to the $2^{m-1}$-bit latch 408, signals having the same frequency as the clock signal 121 and respectively shifted in phase by $\pi/2^{m-1}$. In FIG. 6, the lower 4 bits are expressed by using a phase shift code. In this case, the $2^{m-1}$-bit latch 408 includes at least $2^{4-1}$ (=8) latches.

Next, the AD conversion operation of the MOS sensor of this embodiment will be described.

First, the column counter 208 included in each column AD conversion circuit 106, the binary counter 104 and the $\pi/2^{m-1}$ phase shift code generation circuit 112 are previously initialized by an initialization signal (not shown), and an initial value of the analog ramp voltage 122 is supplied from the DAC 105 to one input port of the comparator 107. Next, a pixel signal is read from a pixel 101 of a selected row to be supplied to the other input port of the comparator 107. Under this condition, the input of the clock signal 121 from the clock generation circuit 120 is started, so that the binary counter 104 starts counting from the initial value. Then, the DAC 105 also starts generating the analog ramp voltage 122 from the initial value in accordance with the counter value of the binary counter 104. Furthermore, at the same time as the start of supply of the clock signal (counter clock signal) 121, the column counter 208 included in the column AD conversion circuit 106 starts counting clock signals 121 input thereto. Simultaneously, the $\pi/2^{m-1}$ phase shift code generation circuit 112 also starts generating a phase shift code.

Thereafter, when the relationship in amplitude between the two signals input to the comparator 107 of a given column is changed, a comparator output signal 123 of this comparator 107 is inverted. Then, the clock signal 121 to be supplied to the column counter 208 of this column is masked, and at the same time, the counting of the column counter 208 is stopped and the column counter 208 holds a current counter value. Similarly, when the comparator output signal 123 is inverted, the $2^{m-1}$-bit latch 408 holds a phase shift code 125 as a data value, at the same timing as the stop of the counting of the column counter 208. Since the analog ramp voltage 122 and the counter values of the column counter 208 and the $\pi/2^{m-1}$ phase shift code generation circuit 112 are synchronized with each other in accordance with the clock signal 121, the read signal from the pixel 101 (i.e., an analog signal) is AD converted into the value held by the column counter 208 and the $2^{m-1}$-bit latch 408 (i.e., a digital signal) through this operation.

As shown in FIG. 6, upper bits excluding the bits replaced with the phase shift code are counted by the column counter 208, and the column counter 208 is driven by a clock signal of the same frequency as the output signal of the $\pi/2^{m-1}$ phase shift code generation circuit 112. Therefore, in the MOS sensor of this embodiment, since the lower $2^{m-1}$ bits are replaced with a shift code to be held by the latch provided in the column AD conversion circuit 106, the clock frequency can be reduced to $\frac{1}{2^{m-1}}$ (specifically, $\frac{1}{16}$ in FIG. 6) when the bit width of the AD conversion is the same as in the conventional MOS sensor. On the contrary, when the clock frequency is the same as that in the conventional MOS sensor, the bit accuracy can be improved by $2^{m-1}$ bits (specifically, 4 bits in FIG. 6).

In other words, although a clock frequency of, for example, 800 MHz is required in the conventional MOS sensor, the clock frequency can be as low as 50 MHz in the MOS sensor of this embodiment. Therefore, a problem derived from signal waveform rounding in the column counters 208 arranged in the form of an array can be largely reduced as well as the clock generation circuit 120 need not have a frequency multiplication function. Furthermore, even in the case where digital memories 108 arranged in the form of an array for storing AD converted values of the respective columns are provided, the problem derived from the signal waveform rounding can be suppressed. Although it is necessary to generate signals respectively shifted in phase by 22.5 degrees from a clock signal of 50 MHz in this embodiment, a DLL (delay-locked loop) circuit may be used for this purpose.

Furthermore, since merely one bit is always changed in a phase shift code when the value is changed by 1, change in the output voltage from the column AD conversion circuit 106 can be made uniform, and an error in reading a signal can be reduced. Moreover, as compared with the case where a binary code is used, the power consumption can be reduced.

Furthermore, in the MOS sensor of this embodiment, an AD converted value is restored from the shift code expression tko the binary code expression by using the phase shift code/binary converter 113. Thus, the number of signals to be input to an output buffer 109 can be reduced, and hence, an effect to reduce the circuit area can be attained particularly when the bit number to be expressed by using the phase shift code is large. Also, as compared with the case where a shift code is directly output to the outside of the MOS sensor, an operation by a DSP or the like can be eased.

In this manner, according to the MOS sensor of this embodiment, occurrence of the problem derived from waveform rounding of a counter clock signal or the like can be suppressed in the case where the conversion bit width or the number of pixels is to be increased for improving the picture quality or in the case where the frame rate is increased for increasing the processing speed.

It is noted that the $\pi/2^{m-1}$ phase shift code generation circuit 112 may be replaced with a Gray code generation circuit for outputting a Gray code so as to express the lower bits by using a Gray code held by the latch provided in the column AD conversion circuit 106. Also in this case, the clock frequency can be lowered or the bit accuracy of the AD conversion can be improved than in the conventional MOS sensor.

Embodiment 3

Figure 7:
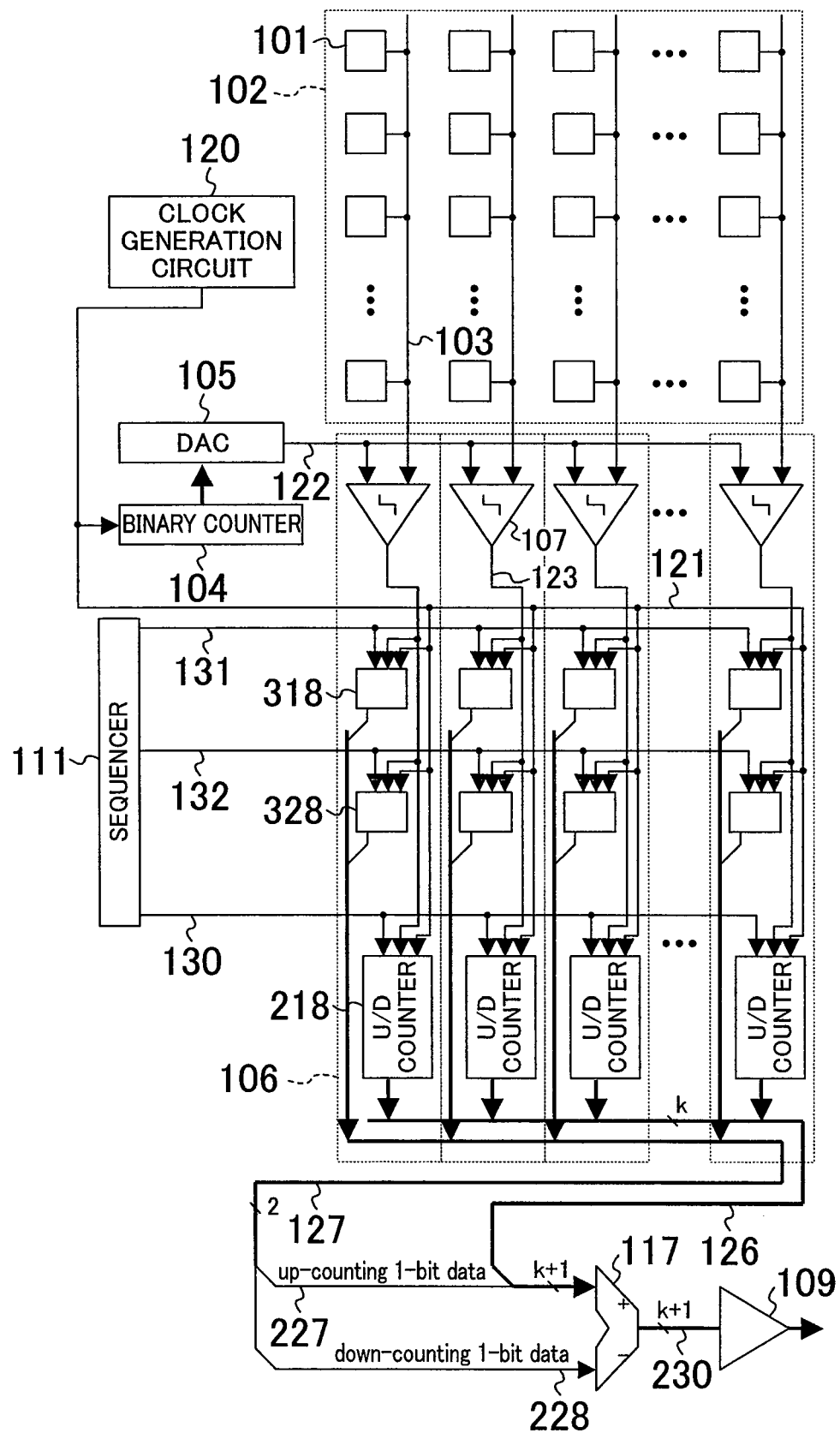
FIG. 7 is a diagram for showing the architecture of a MOS sensor according to Embodiment 3 of the invention.

FIG. 7 is a diagram for showing the architecture of a MOS sensor according to Embodiment 3 of the invention.

As shown in FIG. 7, the MOS sensor of this embodiment is the same as the MOS sensor of Embodiment 1 in the connection from a pixel array 102 to comparators. However, as a characteristic of the MOS sensor of this embodiment, a column AD conversion circuit 106 provided corresponding to each column of pixels 101 includes an up/down counter (hereinafter referred to as the U/D counter) 218. Also, the MOS sensor of this embodiment includes a sequencer 111.

Each column AD conversion circuit 106 includes a comparator 107, the U/D counter 218, an up-counting latch (hereinafter referred to as the U latch) 318 and a down-counting latch (hereinafter referred to as the D latch) 328.

A clock generation circuit 120 supplies a clock signal 121 not only to a binary counter 104 but also to the U/D counter 218, the U latch 318 and the D latch 328 of every column. A binary value output from the binary counter 104 is input to a DAC 105, and the DAC 105 generates an analog ramp voltage (a triangle wave) 122 in accordance with the input binary value. The analog ramp voltage is input to an input port of the comparator 107 as a reference potential. A pixel signal read from a pixel 101 through a read signal line 103 is input to the other input port of the comparator 107. A comparator output signal 123 is input to the U/D counter 218, the U latch 318 and the D latch 328.

Next, the AD conversion operation of the MOS sensor of this embodiment will be described.

The sequencer 111 switches an operation mode of the MOS sensor (or an imaging device including the MOS sensor). In this embodiment, the sequencer 111 controls a count mode switching signal 130 for controlling a counting direction of the U/D counter 218, and a U-counting latch selection signal 131 and a D-counting latch selection signal 132 for switching the latches between up-counting and down-counting.

First, the U/D counter 218 included in the column AD conversion circuit 106 and the binary counter 104 are previously initialized by an initialization signal (not shown), and an initial value of the analog ramp voltage 122 is supplied from the DAC 105 to one input port of the comparator 107. Also, assuming that the down-counting is first performed, the D latch 328 is activated by the D-counting latch selection signal 132, and the U/D counter 218 is placed in a down mode (D mode) by the count mode switching signal 130. Next, a reset level of a pixel 101 is read from a pixel 101 of a selected row to be supplied to the other input port of the corresponding comparator 107. Then, the input of the clock signal 121 generated by the clock generation circuit 120 is started, so that the binary counter 104 can start counting from the initial value. The DAC 105 starts generating the analog ramp voltage 122 from the initial value in accordance with the counter value of the binary counter 104. At this point, the counting direction of the binary counter 104 is always the same in the down-counting and the up-counting. Furthermore, at the same time as the start of the supply of the clock signal 121, the U/D counter 218 included in the column AD conversion circuit 106 starts the down-counting of clock signals 121 input thereto.

Thereafter, when the relationship in amplitude between the two signals input to the comparator 107 of a given column is changed, the comparator output signal 123 of this comparator 107 is inverted, and the clock signal 121 to be supplied to the U/D counter 218 of this column is masked. At the same time, the U/D counter 218 stops counting and stores a current counter value. Similarly, when the comparator output signal 123 is inverted, the corresponding D latch 328 holds the clock signal 121 as a data value at the same timing as the stop of the counting of the U/D counter 218. Since the analog ramp voltage 122, the counter value of the U/D counter 218 and the value of the D latch 328 are synchronized with one another in accordance with the clock signal 121, the reset level of the pixel 101 (i.e., an analog signal) is AD converted into the value held by the U/D counter 218 and the D-counting latch 328 (i.e., a digital signal) through this operation.

Next, the up counting is performed as follows:

First, the U latch 318 is activated by the U-counting latch selection signal 131, and the U/D counter 218 is placed in an up mode (U mode) by the count mode switching signal 130. At this point, the U/D counter 218 holds the value having been held in the precedent D mode. Next, a pixel signal is read from a pixel 101 of a selected row to be supplied to the other input port of the comparator 107. Then, the input of the clock signal 121 generated by the clock generation circuit 120 is started so that the binary counter 104 can start counting from the initial value. The DAC 105 starts generating the analog ramp voltage 122 from the initial value in accordance with the counter value of the binary counter 104. Also, at the same time as the start of the supply of the clock signal 121, the U/D counter 218 included in the column AD conversion circuit 106 starts the up-counting of clock signals 121 input thereto from the holding value. Thereafter, when the relationship in amplitude between the two signals input to the comparator 107 of a given column is changed, the comparator output signal 123 of this comparator 107 is inverted, and the clock signal 121 to be supplied to the U/D counter 218 of this column is masked. At the same time, the U/D counter 218 stops counting so as to hold a current counter value. The value held at this point is (an up counter value obtained in U mode)−(a down counter value obtained in D mode).

Similarly, when the comparator output signal 123 is inverted, the U latch 318 holds the clock signal 121 as a data value at the same timing as the stop of the counting of the U/D counter 218.

Next, a k-bit data value output from the U/D counter 218 and a 1-bit data value output from the U latch 318 are collected as a k+1-bit data value on output signal buses 126 and 227 to be input to a subtractor 117. Also, a data value output from the D latch 328 is input to the subtractor 117 through output signal buses 127 and 228. Subsequently, an image signal output from the subtractor 117 is output to the outside of the MOS sensor through an output signal bus 230 and an output buffer 109. In this manner, a difference between an AD converted value obtained in the up-counting and an AD converted value obtained in the down-counting is obtained, so that a signal corresponding to the difference can be output as the AD converted value.

In this manner, the influence of offset noise on a portion from the pixels to the column AD conversion circuit of every column can be eliminated by using the U/D counter 218, and therefore, a good output image can be obtained.

Also in the case where the column AD conversion circuit 106 of every column includes the U/D counter 218 and the latches corresponding to 1 bit as in this embodiment, the frequency of the clock signal 121 can be halved by holding data corresponding to the least significant bit in the latches in the same manner as in the MOS sensor of Embodiment 1. Alternatively, when the frequency of the clock signal 121 is the same, the accuracy of the AD conversion can be improved corresponding to 1 bit as compared with the case where the latches are not provided.

Figure 9:
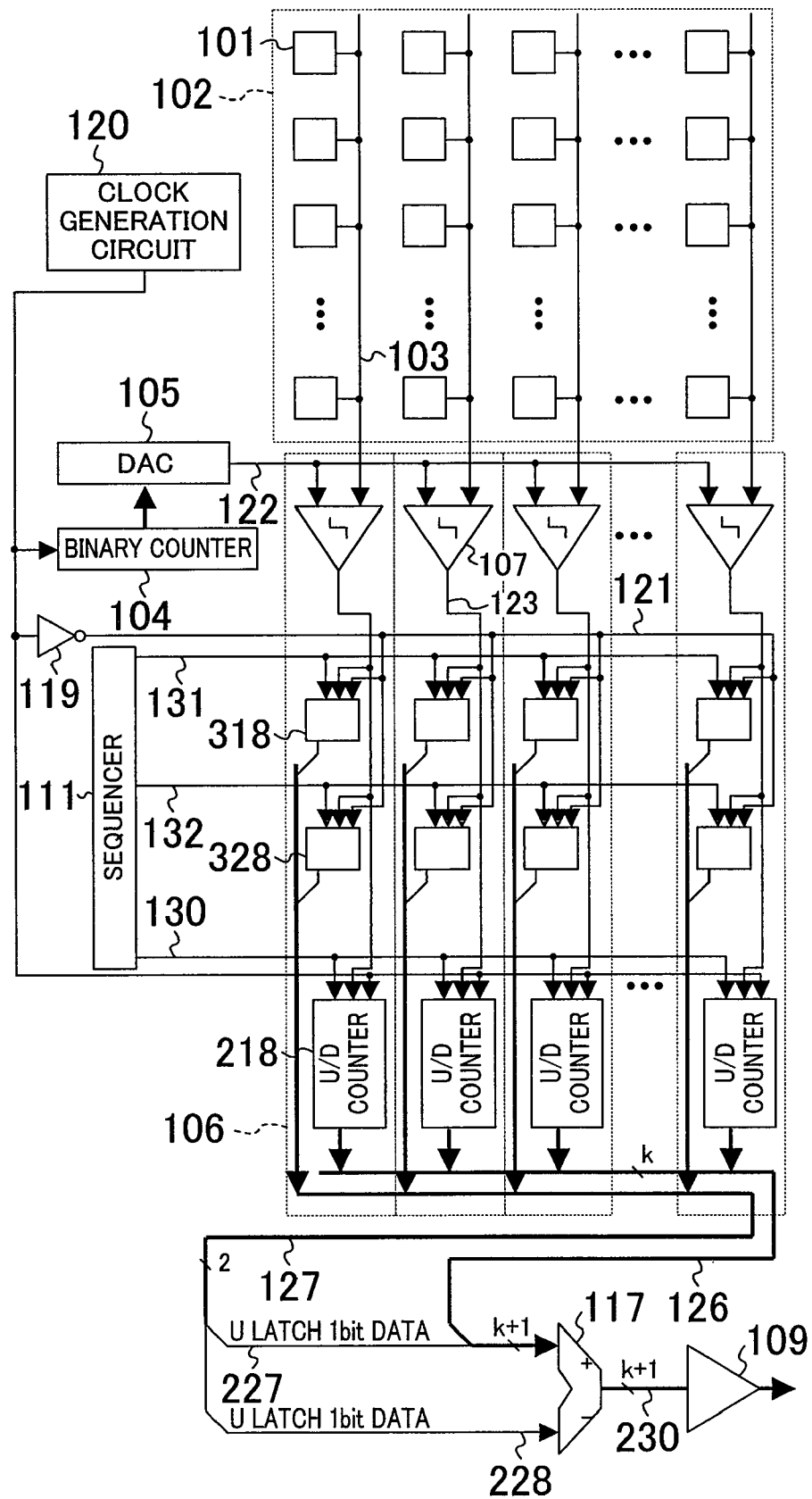
FIG. 9 is a diagram of a MOS sensor according to another modification of Embodiment 3.

Furthermore, in the same manner as in the MOS sensor of Embodiment 1, the polarity of a data value of the latch corresponding to the least significant bit may be reverse in the MOS sensor of this embodiment when the clock signal to be supplied to the U/D counter 218 is commonly used as a signal to be input to the latches. In this case, as shown in FIG. 9, an inverter 119 is provided between the clock generation circuit 120 and the U and D latches 318 and 328. Alternatively, an inverter 119 may be inserted on the signal output bus 127. Alternatively, the connection of the 1-bit data output is switched between the up-counting and the down-counting, so as to input the output of the counter to a positive side of the subtractor together with the data of the down-counting and to input the data of the up-counting to a negative side of the subtractor. Thus, the number of signal lines used for supplying signals to the latches can be reduced.

Figure 8:
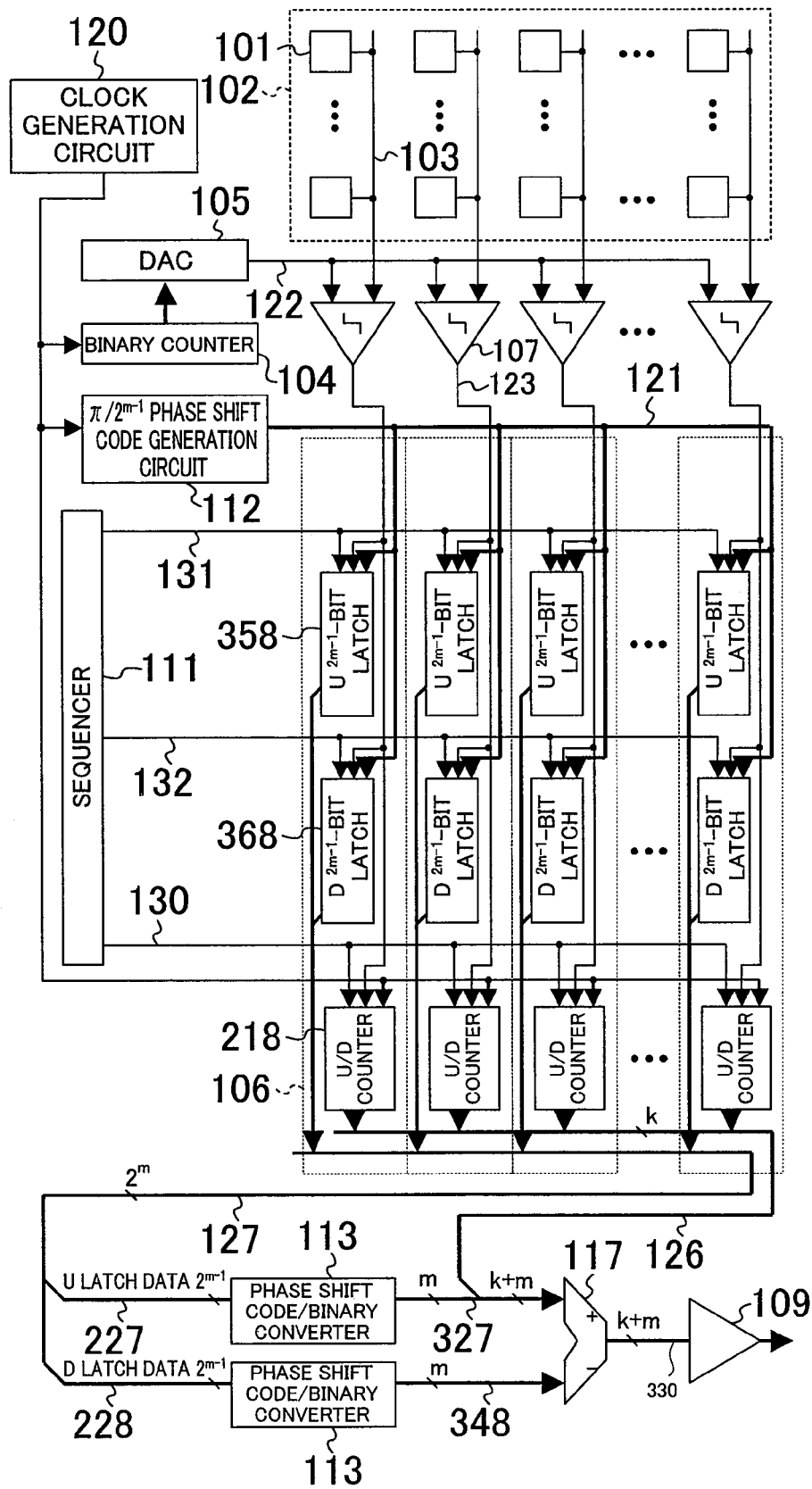
FIG. 8 is a diagram of a MOS sensor according to a modification of Embodiment 3.

Although not described herein in detail, in the case where a phase shift code is employed with $2^{m-1}$ up-counting latches and down-counting latches (i.e., a U $2^{m-1}$-bit latch 358 and a D $2^{m-1}$-bit latch 368) provided in every column AD conversion circuit 106 as shown in FIG. 8, the effect to lower the clock frequency or to improve the AD conversion accuracy can be attained in the same manner as in Embodiment 2. A MOS sensor according to a modification of this embodiment shown in FIG. 8 includes, in the same manner as the MOS sensor of Embodiment 2 shown in FIG. 5, a $\pi/2^{m-1}$ phase shift code generation circuit 112 and a phase shift code/binary converter 113 for restoring the expression of input data from a phase shift code to a binary code. However, the phase shift code/binary converter 113 is provided on each of the output signal bus 227 for transferring U latch data and the output signal bus 228 for transferring D latch data. A binary signal output from the phase shift code/binary converter 113 provided on the output signal bus 227 is input to the subtractor 117 through an output signal bus 327. Also, a binary signal output from the phase shift code/binary converter 113 provided on the output signal bus 228 is input to the subtractor 117 through an output signal bus 348. An image signal of full bits output from the subtractor 117 is output to the outside of the MOS sensor from the output buffer 109.

As described so far, lower 4 bits of an AD converted value are expressed by using a phase shift code in accordance with a latch clock signal. Also a lower 5 or more bits of an image signal can be expressed similarly in accordance with a latch clock signal, and thus, the clock frequency can be largely lowered. However, the number of signal lines for supplying latch clock signals is doubled corresponding to 1 bit increase, a bit number for changing the expression appropriate for the use is preferably selected in consideration of the trade off relationship between the increase of the layout area and the lowering of the clock frequency.

In every column AD conversion circuit 106 of each embodiment described above, the digital memory or the latch to be used together with the counter is specified as a memory or a latch for the AD conversion. In the column AD conversion, data read and the AD conversion are generally performed in parallel in limited time of one horizontal scanning period (1H). In other words, an operation for reading data having been AD converted with respect to one previous line out to the outside of the chip and the AD conversion of data with respect to a current line are generally performed in parallel. In this case, every column AD conversion circuit 106 may further include an outputting memory for receiving an output from the latch for holding data of lower bits and an output from the column counter (or the U/D counter) and capable of holding an AD converted value.

Figure 10:
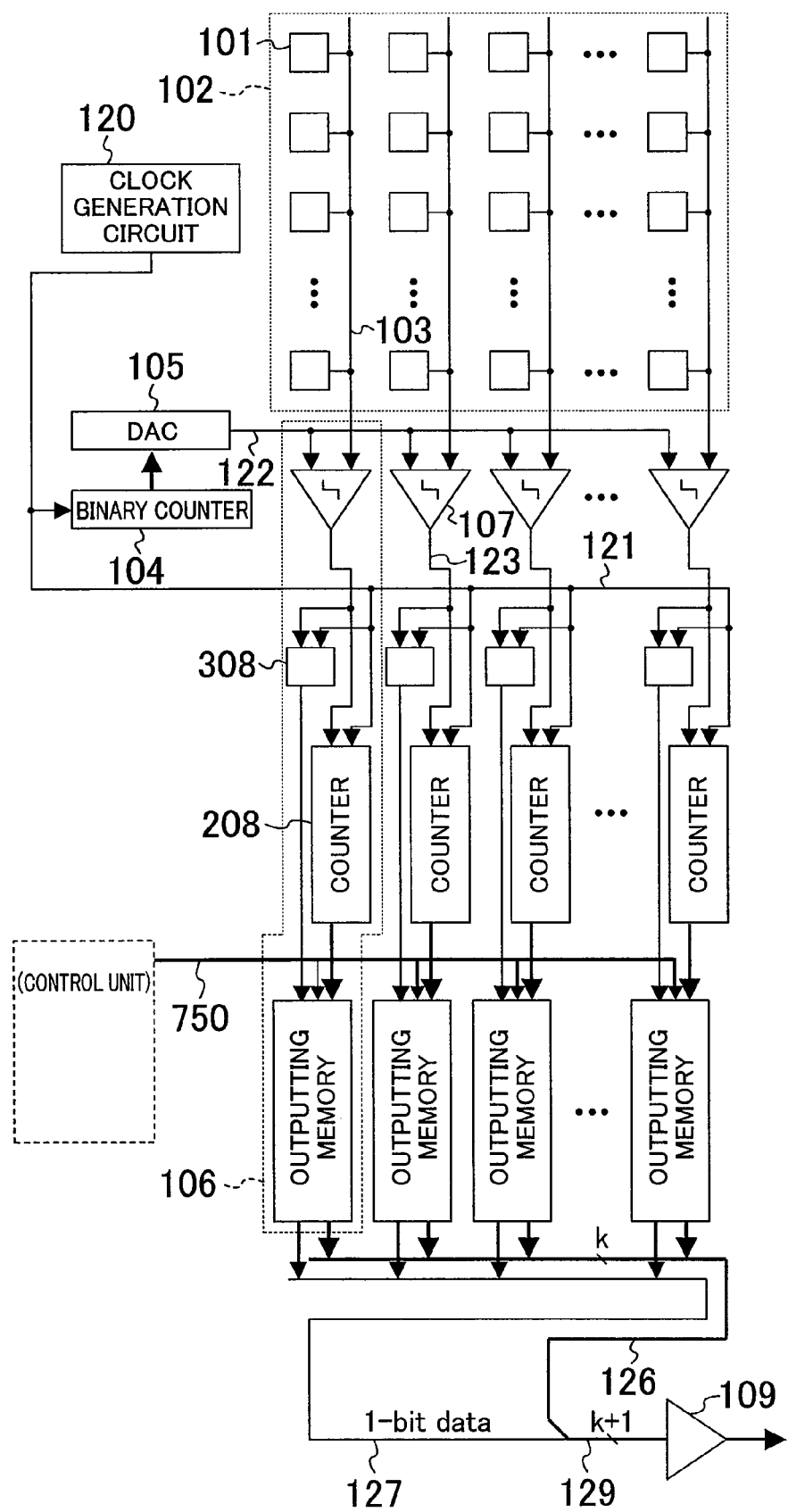
FIG. 10 is a diagram of a MOS sensor obtained by providing an outputting memory in the column AD conversion circuit of the MOS sensor of Embodiment 1.

FIG. 10 is a diagram for showing the architecture of a MOS sensor obtained by additionally providing an outputting memory in every column AD conversion circuit 106 of the MOS sensor of Embodiment 1. This outputting memory 250 includes k outputting latches for copying data of upper k bits held in the column counter 208 and $2^{m-1}$ outputting latches (one outputting latch in the exemplified architecture of FIG. 10) for copying data of lower m bits held by $2^{m-1}$ latches. It is noted that n=k+m assuming that the bit number of the AD conversion is n bits. In this case, every time the AD conversion of pixel signals of one row is completed, AD converted values of the respective columns each held by the r (wherein r=k+ $2^{m-1}$) outputting latches are read out successively to output data buses by a column scanning circuit (a control unit) for driving a control line 750. At the same time as this read operation, the AD conversion with respect to pixels of a next row is performed. Such processing is successively executed, so that AD converted pixel signals corresponding to one frame can be rapidly output.

Furthermore, the above description does not illustrate means for supplying the counter clock signal to the column counter 208 or the U/D counter 218 until the voltage of an image signal output from a pixel 101 becomes equal to the potential of the analog ramp voltage 122 and for masking the clock signal to be supplied to the column counter 208 or the U/D counter 218 after the voltage of the image signal output from the pixel 101 becomes equal to the potential of the analog ramp voltage 122. As this masking means, a general masking method such as an AND gate receiving, as inputs, the clock signal 121 and the comparator output signal 123 can be employed.

An analog CDS operation generally performed as a part of the reading sequence from the pixels 101 is omitted in the description of the MOS sensors of Embodiments 1 through 3 for simplifying the description. In the MOS sensor of each embodiment, the analog CDS operation may be performed. In this case, in the sequence for successively reading pixels of each row, the number of items to be processed within processing time for one row (1H) is increased, but the CDS operation can be performed without causing any problem because the AD conversion can be rapidly performed by the MOS sensor of this invention.

Moreover, although the counter value is used for generating the analog ramp voltage 122 by the DAC 105 in each of the embodiments, the DAC 105 may be a DA conversion circuit that does not use the counter value but is initialized by a reset signal and freely runs in response to the input of the clock signal.

Furthermore, in the case where a system for generating an analog ramp wave through discharge using an RC time constant is applied to the AD conversion of this invention, there is no need to input a clock signal, and the AD conversion can be performed merely by initializing the potential of a capacity provided in the DA conversion circuit 105 in accordance with a reset signal.

Also, when a phase shift code is directly output, the number of signals to be input to the output buffer 109 is large. Therefore, data expressed by using a phase shift code is converted into a binary code to be output as a premise in the description referring to FIG. 5, 8 or the like. However, when the bit number to which a phase shift code is applied is small, the increase in the number of signal lines is small even as compared with the case where a binary code alone is used, and hence, data of a phase shift code may be directly output to the outside.

Furthermore, although the circuit for generating a phase shift code and the circuit for converting a shift code into a binary code are provided in the above description, a MOS sensor may include a circuit for converting a binary code into a Gray code and a circuit for converting a Gray code into a binary code. Alternatively, a MOS sensor may include merely a circuit for converting a binary code into a Gray code so as to output an image signal in the form of a Gray code. Even in this case, the effect of the invention to lower the clock frequency or to improve the bit accuracy can be similarly attained.

Moreover, although the comparator 107 is a two-input type in each of the embodiments described above, the effect of the invention can be attained by using a comparator of what is called a chopper type.

Also, although the connection through the read signal line 103 between the pixels and the comparator 107 is simply described so as to be easily understood, the effect of the invention is not spoiled even when a circuit having an analog signal amplifying function or a CDS function is provided on an input side of the comparator 107.

Furthermore, an image processing circuit (a DSP circuit) for processing an image signal output from the output buffer 109 may be formed on the same substrate as or different substrate from the pixel array 102.

In addition, the sequencer 111 shown in FIG. 8 or 9 may be provided in the MOS sensor of Embodiment 1 or 2.

Embodiment 4

Now, specific configurations of the $\pi/2^{m-1}$ phase shift code generation circuit 112 used in the MOS sensor of FIG. 5 or 8 will be described.

First Configuration Example of Phase Shift Code Generation Circuit

Figure 11A:
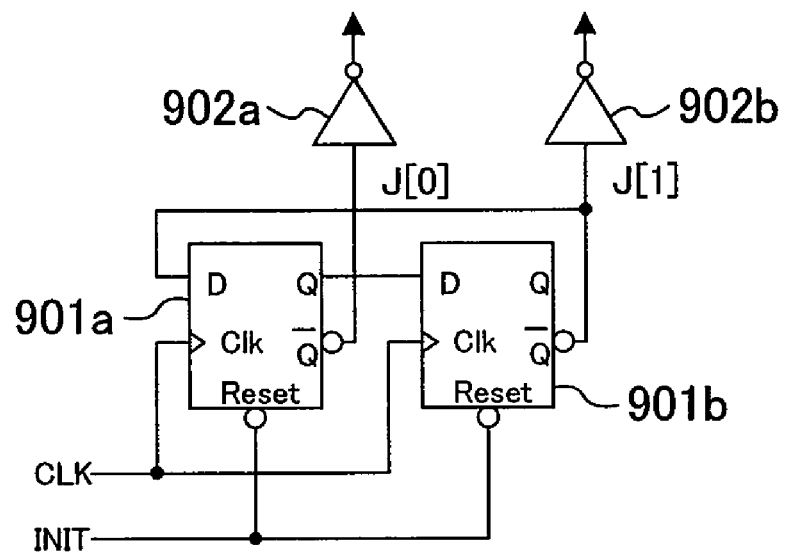
FIG. 11A is a circuit diagram of a $2^{m-1}$-bit phase shift code generation circuit of a first configuration example using a Johnson counter and FIG. 11B is a diagram of waveforms obtained in the $2^{m-1}$-bit phase shift code generation circuit of the first configuration example.
Figure 11B:
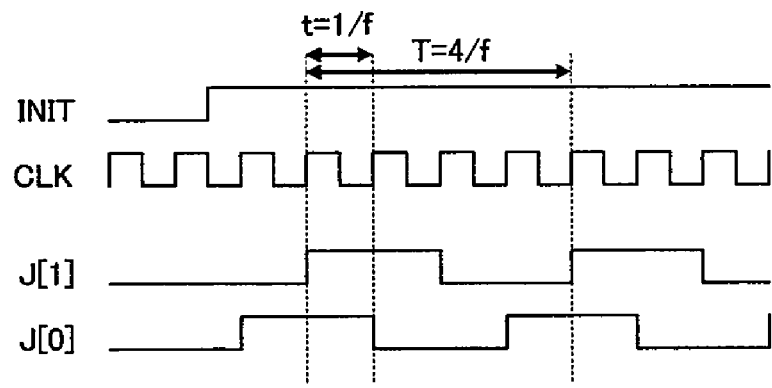
Figure 12A:
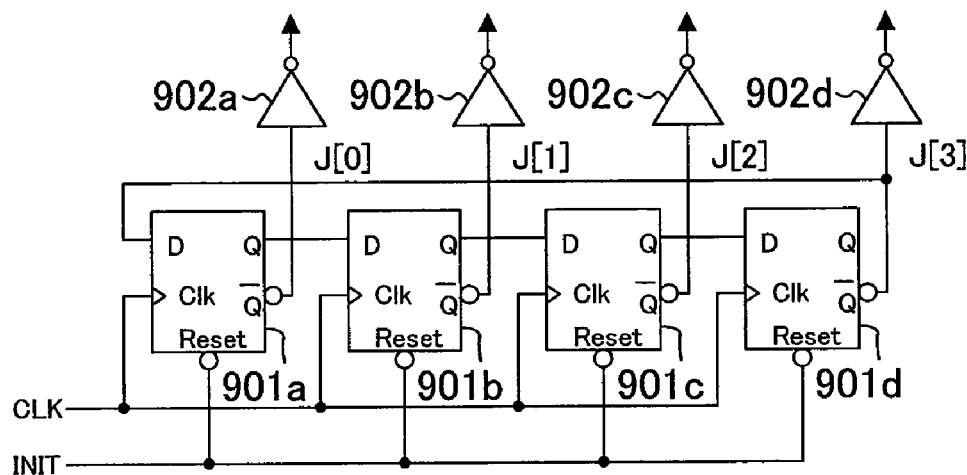
FIG. 12A is a circuit diagram of another $2^{m-1}$-bit phase shift code generation circuit of the first configuration example using a Johnson counter and FIG. 12B is a diagram of waveforms obtained in the $2^{m-1}$-bit phase shift code generation circuit of the first configuration example in the case m=3.
Figure 12B:
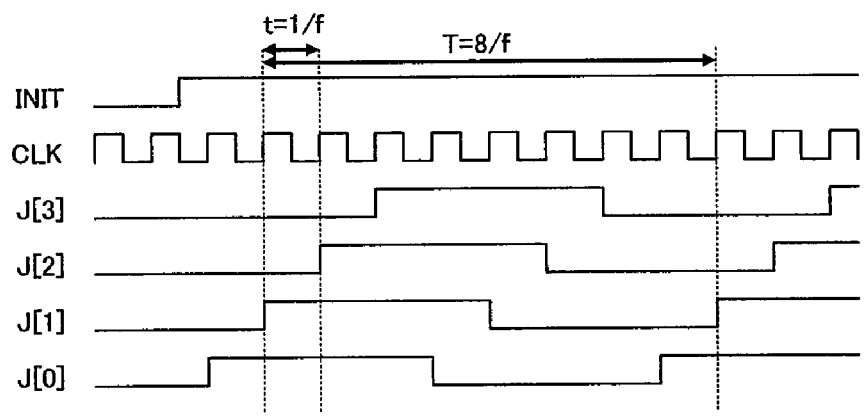

FIGS. 11A and 12A are circuit diagrams of a phase shift code generation circuit of a first configuration example using a Johnson counter, and FIGS. 11B and 12B are diagrams for showing signal waveforms obtained in the phase shift code generation circuit of the first configuration example. FIG. 11A shows a circuit diagram employed when the bit number, $2^{m-1}$, is 2, and FIG. 12A shows a circuit diagram employed when the bit number, $2^{m-1}$, is 4, wherein m is a bit number when a binary code is used.

The phase shift code generation circuit shown in FIG. 11A includes D flip flops 901a and 901b both for receiving a clock signal CLK (a latch clock signal), an inverter 902a for outputting a signal J[0] and an inverter 902b for outputting a signal J[1]. An output of the D flip flop 901a disposed at the first stage is input to the D flip flop 901b disposed at the second stage, and an inverted output of the D flip flop 901b is input to the D flip flop 901a. In other words, the D flip flops 901a and 901b together form a loop. Also, an inverted output of the D flip flop 901a is input to the inverter 902a and an inverted output of the D flip flop 901b is input to the inverter 902b.

Owing to this configuration, a phase shift code J[1:0] in which the phase is shifted corresponding to the cycle of the clock signal CLK from the initial state of all zeros can be generated as shown in FIG. 11B.

Furthermore, when D flip flops 901a, 901b, 901c and 901d of four stages are serially connected to one another in the same manner as in a general shift register and an inverted output of the D flip flop 901d disposed at the final stage is input to the D flip flop 901a disposed at the first stage as shown in FIG. 12A, inverters 902a, 902b, 902c and 902d can respectively output signals J[0], J[1], J[2] and J[3] shifted in phase from each other corresponding to the cycle of the clock signal CLK. In other words, when the configuration of FIG. 12A is employed, a phase shift code J[3:0] in which the phase is shifted corresponding to the cycle of the clock signal CLK from the initial state of all zeros can be generated as shown in FIG. 12B.

In the Johnson counter of the first configuration example, it is necessary to input a clock signal of a high frequency (which is shown as the clock signal CLK in FIGS. 11A and 12A and as the clock signal 121 in FIG. 5) for driving the counter. However, merely one phase shift code generation circuit is necessary for the column AD conversion circuits of all the columns, and hence, even when a clock signal of a high frequency is supplied to the phase shift code generation circuit, a problem of rounding of the clock signal or the like does not occur. Therefore, when the first configuration example is employed, a phase shift code can be generated without causing the problem of waveform rounding or the like.

The phase shift code generation circuit of FIG. 12A is used when the bit number is $2^{m-1}=4$, and in the case where this circuit is included in the MOS sensor described in Embodiment 3, the maximum frequency of the signal can be lowered to ⅛ of that attained in the AD conversion performed by using a binary code alone and lowered to ¼ of that attained in the AD conversion performed by using a Gray code alone. Alternatively, in the case where a clock signal of the same frequency as in an AD conversion circuit using a Gray code alone is used, the accuracy is improved by 3 bits as compared with the case where a binary code alone is used and by 2 bits as compared with the case where a Gray code alone is used.

Although the configurations of the phase shift code generation circuit employed when the bit number is 2 and 4 are described above, a phase shift code generation circuit applicable to an arbitrary bit width can be obtained by serially connecting D flip flops in the number corresponding to the bit number and allowing an inverted output of the D flip flop disposed at the final stage to be input to the D flip flop disposed at the first stage.

Second Configuration Example of Phase Shift Code Generation Circuit

When the frequency is very high, it is difficult to generate a fast clock due to the restriction in device performance and the like rather than the problem of the waveform rounding caused in distributing a clock signal. As a countermeasure, the frequency of an input clock signal can be suppressed to the same frequency level as a phase shift code generated by a phase shift code generation circuit by using a delay-locked loop circuit (hereinafter referred to as a DLL).

Figure 13A:
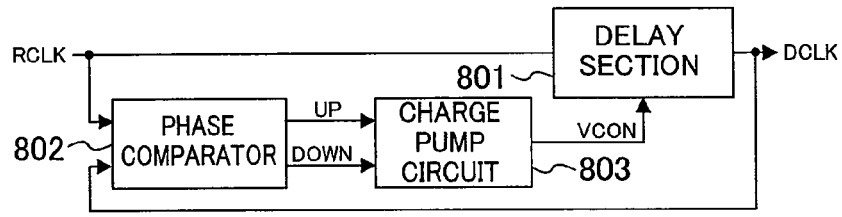
FIGS. 13A and 13B are diagrams of a $2^{m-1}$-bit phase shift code generation circuit of a second configuration example using a DLL.
Figure 13B:
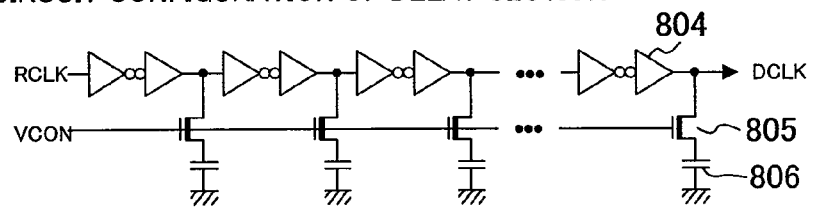

FIGS. 13A and 13B are diagrams of a phase shift code generation circuit of a second configuration example using a DLL.

The phase shift code generation circuit of the second configuration example shown in FIG. 13A includes a phase comparator 802, a charge pumping circuit 803 and a delay section 801. In this configuration example, a clock signal RCLK (a latch clock signal) input to the phase comparator 802 is delayed by the delay section 801 so as to be output as a signal DCLK. Specifically, the phase comparator 802 compares the signals RCLK and DCLK and generates an up or down signal corresponding to delay therebetween so that the delay can be just one cycle. The charge pumping circuit 803 receives the up or down signal from the phase comparator 802 so as to generate a voltage signal VCON in accordance with the received signal.

The delay section 801 is a circuit in which a capacity 806 is added as a load through an NMOS transistor switch (hereinafter referred to as the MOS switch) 805 to an inverter chain including inverters 804 connected in multiple stages. The voltage signal VCON is used for controlling the gate potential of the MOS switch 805 connected to the capacity 806. When the voltage signal VCON is increased, the on resistance of the MOS switch 805 is lowered, the capacity is increased as the load and the delay is increased. On the contrary, when the voltage signal VCON is reduced, the on resistance of the MOS switch 805 is increased, the capacity is reduced as the load and the delay is reduced.

Figure 14:
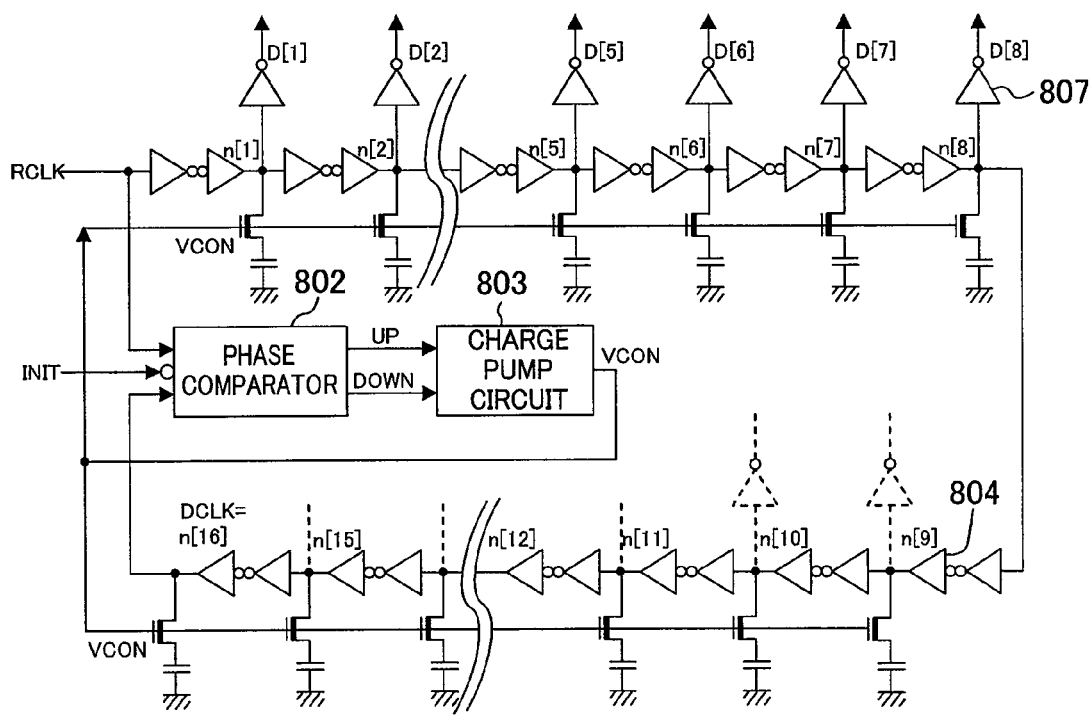
FIG. 14 is a diagram for showing an exemplified configuration of a $2^{m-1}$-bit phase shift code generation circuit for outputting signals shifted in phase by $\pi/2^{m-1}$ by utilizing the circuit configuration of the DLL shown in FIGS. 13A and 13B.

FIG. 14 is a diagram for showing an exemplified configuration of a phase shift code generation circuit for outputting signals shifted in phase by $\pi/2^{m-1}$ by utilizing the circuit configuration of the DLL shown in FIGS. 13A and 13B.

As shown in FIG. 14, owing to the function of the DLL for adjusting the phases of an original clock signal RCLK and a delayed clock signal DCLK obtained through 16 delaying stages, clock signals n[1], n[2], . . . , n[15] and n[16] (=delayed clock signals DCLK) delayed corresponding to ¹⁄₁₆ of one cycle in each delaying stage (i.e., with phase delay of π/8) can be obtained. When the clock signals are taken out from adjacent 8 nodes (for example, signals D[1] through D[8] resulting from buffering the signals n[1] through n[8] by clock buffers 807 are taken out), the circuit shown in FIG. 14 can be used as a phase shift code generation circuit. It is noted that there is no need to take out the clock signals n[9] through n[16] from the corresponding nodes but these nodes are preferably provided with buffers for improving the timing accuracy by equalizing the load in the respective delaying stages.

The phase shift code generation circuit of the second configuration example for generating a phase shift code of a given bit width has been described, and a phase shift code of a different bit width can be easily generated by changing the number of stages of shift registers included in the phase shift code generation circuit or the number of delaying stages of the DLL.

The phase shift code generation circuit shown in FIG. 14 is used when the bit width m is 4, and when this phase shift code generation circuit is included in the MOS sensor described in Embodiments 2 and 3, the maximum frequency of the signal can be lowered to ¹⁄₁₆ of that attained in the AD conversion performed by using a binary code alone and lowered to ⅛ of that attained in the AD conversion performed by using a Gray code alone. Alternatively, in the case where a clock signal of the same frequency is used, the accuracy is improved by 4 bits as compared with the case where a binary code alone is used and by 3 bits as compared with the case where a Gray code alone is used.

When such a phase shift code generation circuit using a Johnson counter is included in any of the MOS sensors according to the other embodiments of the invention, there is no need to require an excessively abrupt rising/falling characteristic of a clock signal or a counter value signal to be distributed to column AD conversion circuits or the like with large RC load.

Furthermore, when a phase shift code generation circuit using a DLL is included, the design specifications can be relaxed in such a manner that there is no need to generate a clock signal of GHz class not only as a (clock) signal to be distributed to the column AD conversion circuits of the respective columns but also as a clock signal generated by the clock generation circuit. Therefore, there is no need to forcedly employ fast CMOS process, which has a characteristic not always compatible with high picture quality process indispensable for an imaging device (a solid state imaging device). Moreover, an effect to reduce noise and electromagnetic radiation within the imaging device can be attained as the imaging system.

FIGS. 15A and 15B are diagrams for showing exemplified configurations of the $2^{m-1}$-bit phase shift code/binary converter 113 shown in FIG. 5 or 8. FIG. 15A shows the configuration employed when the bit width m is 2 and FIG. 15B shows the configuration employed when the bit width m is 3.

As shown in FIG. 15A, when the bit width m is 2, data values PS[0] and PS[1] of a phase shift code input to the phase shift code/binary converter are both input to an exclusive OR circuit 905 to be converted into a data value BIN[0] of a binary code. Also, the data value PS[1] corresponding to the most significant bit of the phase shift code is directly output as the most significant bit BIN[1] of the binary code.

Alternatively, as shown in FIG. 15B, when the bit width m is 3, three exclusive OR circuits 905 are provided, so that data values PS[0] and PS[2] can be input to the exclusive OR circuit 905a of the first stage and data values PS[1] and PS[3] can be input to the other exclusive OR circuit 905b of the first stage. Outputs of the exclusive OR circuits 905a and 905b are input to the exclusive OR circuit 905c of the second stage, so as to output the least significant bit BIN[0] of a binary code from the exclusive OR circuit 905c. A data value BIN[1] of the binary code is output from the exclusive OR circuit 905b, and the most significant bit PS[3] of the phase shift code is directly output as the most significant bit BIN[2] of the binary code. Thus, the conversion from a phase shift code to a binary code can be easily performed through a combination of exclusive OR circuits.

Embodiment 5

Two-dimensional array type MOS sensors will now be described in preferred embodiments of the invention with reference to the accompanying drawings. It is noted that the embodiments described below are not restrictive and that the architecture or the driving method of this invention are widely applicable to various semiconductor devices each of which is used for detecting a physical quantity distribution and includes a plurality of unit composing elements sensitive to externally input electromagnetic waves such as light and radiant rays and arranged in the form of a line or a matrix.

In each solid state imaging device described in Embodiments 5 through 7 below, what is called a CDS (correlated double sampling) operation for subtracting a reset level read from a pixel from a signal level read from the pixel is generally performed in an analog region by using a S/H (sample and hold) capacity or performed in a digital region with the reset level also AD converted, which is omitted for simplification in the following description because it is not directly related to the scope of the invention.

As described in detail in the following embodiments, the present invention is characterized by expressing lower bits by using a phase shift code in the AD conversion of a signal read from a pixel (sensitive element) for lowering a clock frequency or improving bit accuracy. In the following embodiments, a "phase shift code" means, as described in Embodiment 2, a binary number in which merely one bit is changed when increased/reduced by 1 and is a code in which bits are successively changed one by one from a lower bit to an upper bit as the value is increased. In other words, in a phase shift code obtained on the assumption that the bit width is P, the number of 1 is successively increased in such a manner that "all bits being 0", "the least significant bit alone being 1", "lower two bits being 11", etc., and when all the bits become 1, the number of 0 is successively increased this time in such a manner that "the least significant bit alone being 0", "lower two bits being 00", etc., resulting in returning to "all bits being 0". Accordingly, by using a phase shift code, 2P kinds of distinctions can be made. For example, when P=4, the following expressions can be obtained by using the phase shift code:

0: 0000
1: 0001
2: 0011
3: 0111
4: 1111
5: 1110
6: 1100
7: 1000
8: 0000

Figure 19:
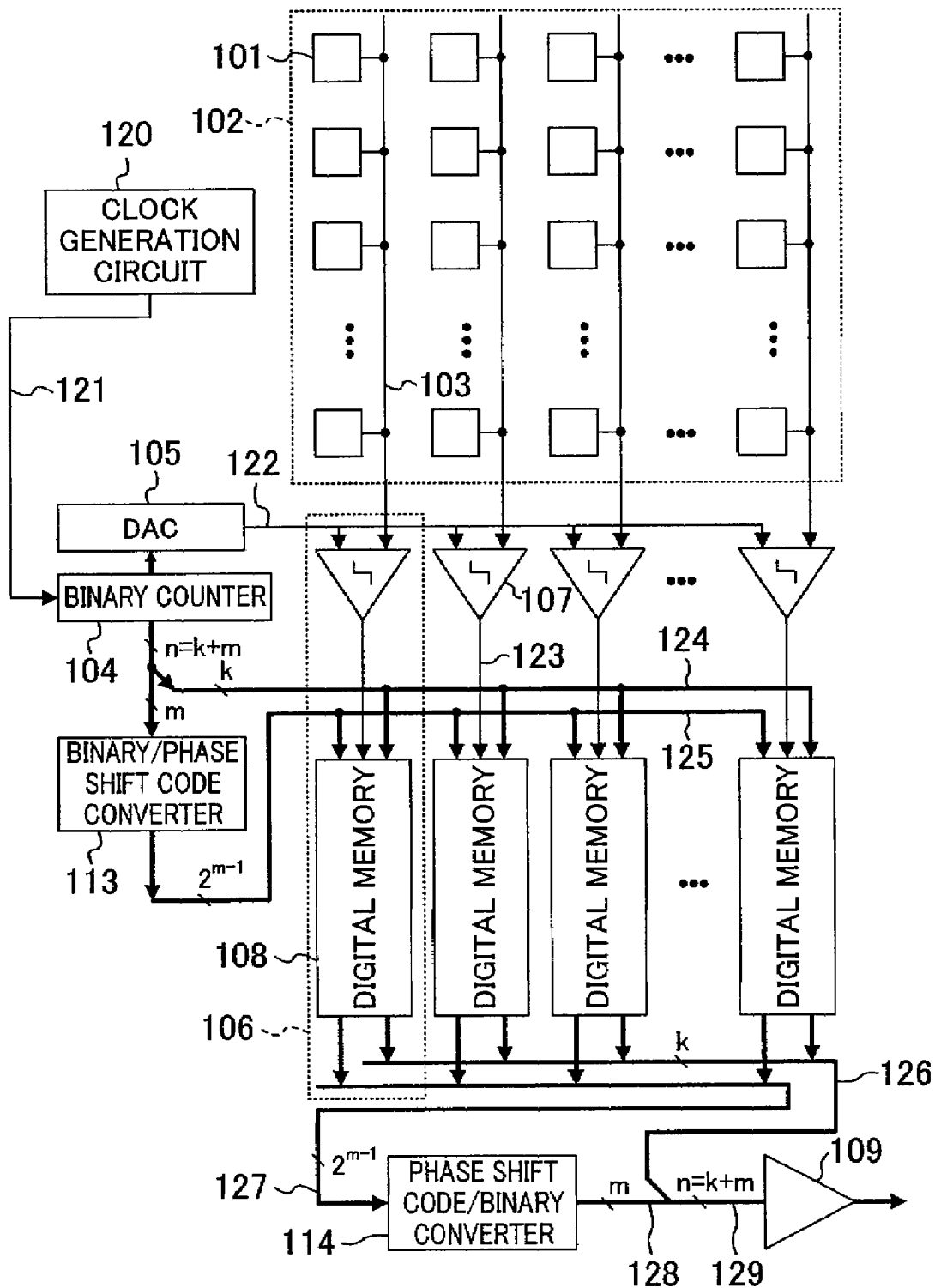
FIG. 19 is a block circuit diagram for showing the architecture of a MOS sensor according to Embodiment 5 of the invention.

FIG. 19 is a block circuit diagram for showing the architecture of a solid state imaging device (a MOS sensor) according to Embodiment 5 of the invention.

As shown in FIG. 19, the MOS sensor of this embodiment includes a pixel array (a sensitive element array) 102 in which pixels (sensitive elements) 101 are arranged in the form of a matrix; a column AD conversion circuit 106 provided corresponding to each column or a plurality of columns of pixels 101 for converting a signal output from a pixel 101 into a digital signal; a column scanning circuit (not shown) for controlling output of the digital signal converted and held by the column AD conversion circuit 106; output signal buses 126, 127, 128 and 129 for transferring the digital signal output from the column AD conversion circuit 106; a clock generation circuit 120 for supplying a clock signal 121; a binary counter 104; a DA conversion circuit (DAC; a reference potential generation circuit) 105; a binary/phase shift code converter (a phase shift code outputting circuit) 113; a phase shift code/binary converter 114; and an output buffer 109 having an input port connected to an output signal bus (a full-bit digital outputting bus) 129. At this point, a pixel includes at least a photosensitive element such as a photodiode or a photogate, and is a unit element equipped, if necessary, with a device structure for reading a signal generated through photoelectric conversion or a structure capable of initialization. It is noted that FIG. 19 shows an exemplified architecture in which the column AD conversion circuit 106 is provided corresponding to each column of pixels.

Each column AD conversion circuit 106 includes a comparator 107 and a digital memory 108.

In the pixel array 102, pixels 101 of each row are selected by a scanning circuit (not shown), and pixel signals are read from the pixels 101 of the selected row through pixel read lines 103. Although not shown in the drawing, the pixel array 102 may be provided with a selection transistor controlled by the scanning circuit.

The pixel signal thus read is input to the comparator 107 included in the column AD conversion circuit 106 provided corresponding to every column of pixels.

The clock generation circuit 120 generates the clock signal 121 related to the AD conversion operation and a clock signal used for controlling another operation. The binary counter 104 of n bits counts clock signals 121 and inputs all the bits of the counter value (corresponding to the n bits) to the DAC 105 as well as inputs upper k bits of the counter value (i.e., an upper bit counter signal) to the digital memory 108 and lower m bits of the counter value (i.e., a lower bit counter signal) to the binary/phase shift code converter 113, whereas there is a relationship of n=k+m among these bit widths.

The binary/phase shift code converter 113 converts the input counter value of the m-bit binary expression into a $2^{m-1}$-bit phase shift code, and inputs its output to the digital memory 108. For example, when the bit width m is 3, 3 bits of a binary code is expressed by a 4-bit phase shift code.

The DA conversion circuit 105 generates an analog ramp voltage (a triangle wave) in accordance with the counter value output from the binary counter 104, and this analog ramp voltage is input to the comparators 107 of all the columns as a reference potential. Each comparator 107 receives the pixel signal and the analog ramp voltage as inputs and outputs a comparator output signal 123 to the corresponding digital memory 108. The digital memory 108 receives, as inputs, a counter output signal 124 corresponding to the upper k bits of the counter value of the binary counter 104 and a $2^{m-1}$-bit phase shift code 125 output from the binary/phase shift code converter 113, and once outputs the phase shift code alone to the phase shift code/binary converter 114. An m-bit digital value converted into a binary code by the phase shift code/binary converter 114 and the upper k bits of the counter value of the binary counter 104 are combined into a digital pixel signal, which is output through the output buffer 109 to the outside of the chip or a signal processor or the like provided on the same substrate as the pixel array 102.

Next, the AD conversion operation of the MOS sensor of this embodiment will be described in detail.

In synchronization with the clock signal 121 input from the clock generation circuit 120, the binary counter 104 starts counting from the initial value and the DAC 105 starts generating the analog ramp voltage 122. Subsequently, a pixel signal read from a pixel 101 of each row and the analog ramp voltage commonly used in all the columns and changed in synchronization with the counter value of the binary counter 104 are input to the comparator 107 of each column. At the same time, the counter value of the binary counter 104 is converted into the phase shift code signal 125 by the binary/phase shift code converter 113, and the phase shift code signal 125 is distributed to the digital memories 108 of the respective columns. Thereafter, when the relationship in amplitude between the two input signals (the analog ramp voltage and the pixel signal) of the comparator 107 of a given column is changed as a result of, for example, increase of the analog ramp voltage, the comparator output signal 123 is inverted.

When the comparator output signal 123 is inverted, the digital memory 108 of this column holds the counter output signal 124 output from the binary counter 104 and the phase shift code signal 125 output from the binary/phase shift code converter 113. Since the analog ramp voltage 122 input to the comparator 107 and the digital values (i.e., the counter output signal 124 and the phase shift code signal 125) input to the digital memory 108 are synchronized with each other through the binary counter 104, the signal read from the pixel 101 (i.e., an analog signal) is AD converted into the value held by the digital memory 108 (i.e., a digital signal) through this operation. It is noted that the digital memory 108 may be constructed by using a cell such as a DRAM for storing data of 0 or 1 in a capacity as charge or constructed by using a half latch or a full latch generally employed in CMOS logic.

The above-described AD conversion operation is performed simultaneously on the pixel signals of all the columns. After the binary counter 104 completes counting all the bit widths, the data of the upper k bits held by the digital memories 108 is selected corresponding to each column by the column scanning circuit (not shown) so as to be input to the output buffer 109 through the output signal buses 126 and 129. Similarly, the data of the lower m bits held by the digital memories 108 is also selected corresponding to each column by the column scanning circuit in the same manner as the upper k-bit data and is input to the phase shift code/binary converter 114 through the output signal bus 127 so as to be input to the output buffer 109 through the output signal buses 128 and 129. An n-bit (whereas n=k+m) AD converted value obtained by concatenating the upper k bits and the lower m bits is output from the output buffer 109.

Next, the effect attained by the MOS sensor of this embodiment will be described. FIG. 20A is a diagram for showing signal waveforms input to a digital memory in performing the AD conversion of an image signal by using a binary code alone, and FIG. 20B is a diagram for showing signal waveforms input to a digital memory in performing the AD conversion of an image signal by using both a phase shift code and a binary code (namely, in this embodiment). As shown in FIG. 20B, in the case where lower m bits are expressed by using a phase shift code, the binary/phase shift code converter 113 outputs $2^{m-1}$ signals having the same frequency but respectively shifted in phase by $\pi/2^{m-1}$.

It is understood from comparison between FIGS. 20A and 20B that when, for example, lower 3 bits of the binary expression are replaced with the phase shift code expression, the maximum frequency of a signal input to the digital memory 108 can be suppressed to ¼ as compared with a signal corresponding to the least significant bit with the maximum frequency in the binary expression (namely, a data value Bin[0] shown in FIG. 20A). On the contrary, when the same frequency is employed, the accuracy can be improved by 2 bits in the AD conversion circuit of this embodiment as compared with the case where a phase shift code is not used. Although the lower 3 bits are replaced in this embodiment, bits to be converted into a phase shift code may be lower 4 or more bits or lower 2 bits. However, in order to lower the signal frequency through the conversion into a phase shift code, lower 2 or more bits should be converted into a phase shift code. In the MOS sensor of this embodiment, since the frequency of the signal to be input to the column AD conversion circuit 106 can be lowered or the bit accuracy can be improved, a highly fine image can be realized. Also, not only when the conversion bit width is increased but also when the number of pixels or the frame rate is increased, the AD conversion processing can be rapidly performed.

Moreover, since a phase shift code is changed always in 1 bit when the value is changed by 1, change in the output voltage from the column AD conversion circuit 106 can be made uniform and an error in reading a signal can be reduced in the MOS sensor of this embodiment. Furthermore, as compared with the case where a binary code is used, the power consumption can be reduced. Moreover, since a signal is inverted corresponding to merely one of all the bits, current change caused by the change of the signal value is small and hence noise is minimally caused.

Also, in the MOS sensor of this embodiment, the lower bits of the AD converted value are restored from the phase shift code expression to the binary expression by using the phase shift code/binary converter 114. Therefore, the number of signals to be input to the output buffer 109 can be reduced, and hence, the circuit area can be reduced particularly when the number of bits expressed by using a phase shift code is large. Furthermore, as compared with the case where a phase shift code is directly output to the outside of the MOS sensor, the operation processing by a DSP or the like can be eased.

Embodiment 6

Figure 21:
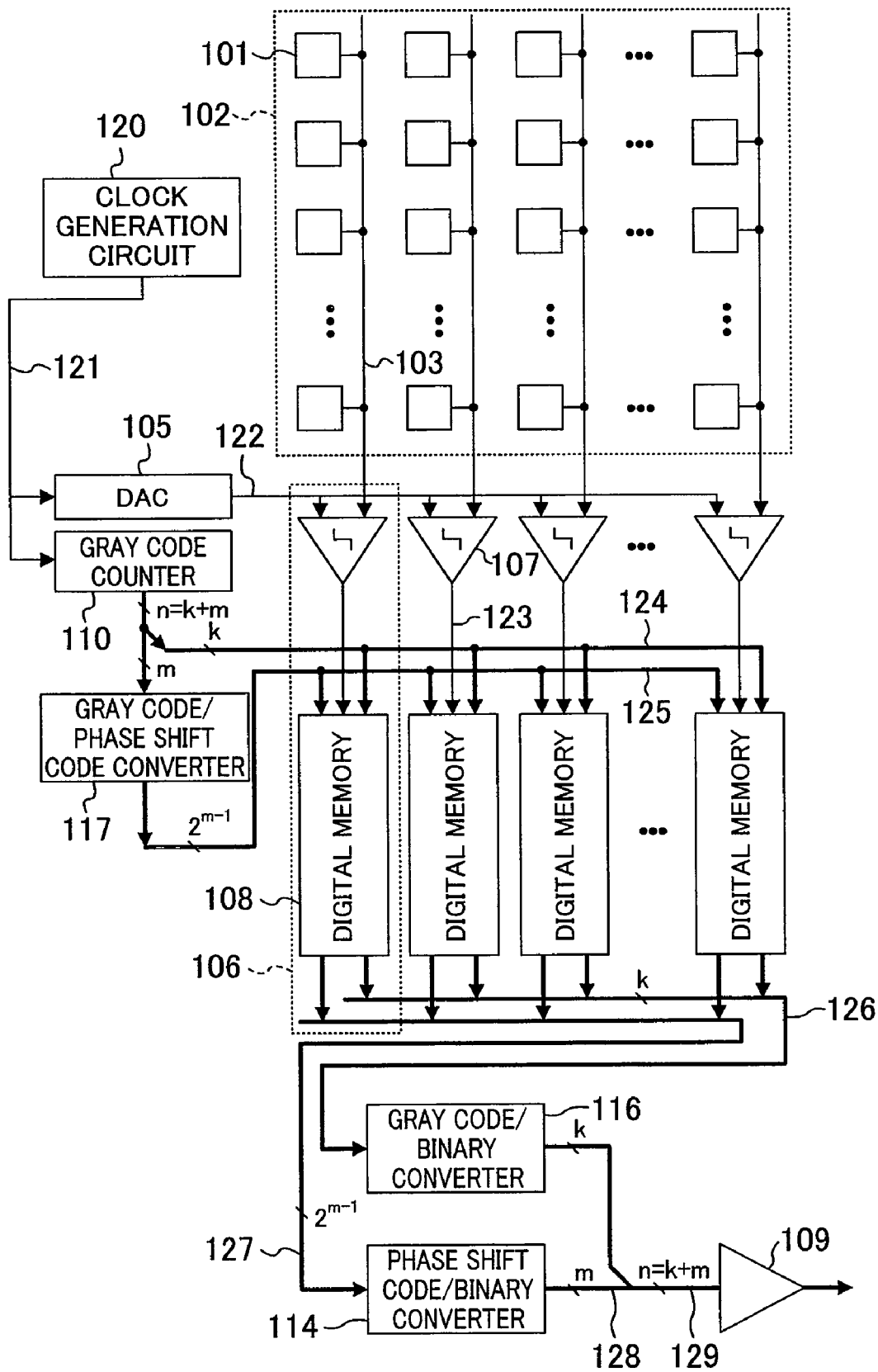
FIG. 21 is a block circuit diagram for showing the architecture of a MOS sensor according to Embodiment 6 of the invention.

FIG. 21 is a block circuit diagram for showing the architecture of a MOS sensor according to Embodiment 6 of the invention. The MOS sensor of this embodiment is different from the MOS sensor of Embodiment 5 in using a Gray code instead of a binary code for the digital expression of upper bits. Therefore, in the MOS sensor of this embodiment, a Gray code counter 110 and a Gray code/phase shift code converter (a phase shift code outputting circuit) 117 are provided respectively instead of the binary counter 104 and the binary/phase shift code converter 113 (see FIG. 19).

Furthermore, in order to convert an output from each column AD conversion circuit 106 from a Gray code to a binary code, an output signal bus 126 corresponding to upper k bits, which is connected to the input port of the output buffer 109 in Embodiment 5, is connected to an input port of a Gray code/binary converter 116, so that data of the upper k bits can be input to an output buffer 109 after being converted into a binary code.

Moreover, a DA conversion circuit 105 of FIG. 21 does not have a general DA conversion circuit specification for generating an analog potential in accordance with an input binary value like the DA conversion circuit of Embodiment 5 shown in FIG. 19, but has a circuit specification for monotonically increasing/reducing an analog potential 122, by just receiving a clock signal 121 only. Except for these points, the architecture of the MOS sensor of this embodiment is the same as that of the MOS sensor of Embodiment 5 and hence the further description of the configuration is omitted.

FIG. 22A is a diagram for showing waveforms of a signal input to a digital memory in performing the AD conversion of an image signal by using a Gray code alone and FIG. 22B is a diagram for showing waveforms of a signal input to a digital memory in performing the AD conversion of an image signal by using both a phase shift code and a Gray code (namely, in this embodiment). In the waveforms of FIG. 22B, a data value G[2:0] corresponding to lower 3 bits of the Gray code expression is replaced with a data value PS[3:0] of phase shift code expression by using the Gray code/phase shift code converter 117.

It is understood from comparison between FIGS. 22A and 22B that the maximum frequency of the signal can be suppressed to ½ in this embodiment where the phase shift code expression is also used as compared with the signal frequency of the least significant bit corresponding to the maximum frequency obtained in using the Gray code expression alone. On the contrary, when a signal of the same frequency as in a conversion circuit using a Gray code alone is used in the column AD conversion circuit 106 of this embodiment, data with accuracy improved corresponding to 1 bit can be obtained, resulting in improving the picture quality.

Although the lower 3 bits are replaced with the phase shift code expression in this embodiment, when the number of bits to be replaced is increased, the signal frequency used for the AD conversion can be further lowered or the bit accuracy of the AD conversion can be further improved.

In this manner, a phase shift code is effectively used in the AD conversion in combination with a Gray code. In the column AD conversion circuit 106 of this embodiment, since a Gray code is used in the AD conversion of the upper bits, the change in the output voltage is made further uniform and an error in reading a signal is further reduced than in the AD conversion circuit of Embodiment 5. Also, since data is restored to the binary expression by using the Gray code/binary converter 116 and the phase shift code/binary converter 114, the number of signal lines can be reduced as compared with the case where these converters are not provided.

Embodiment 7

Figure 23:
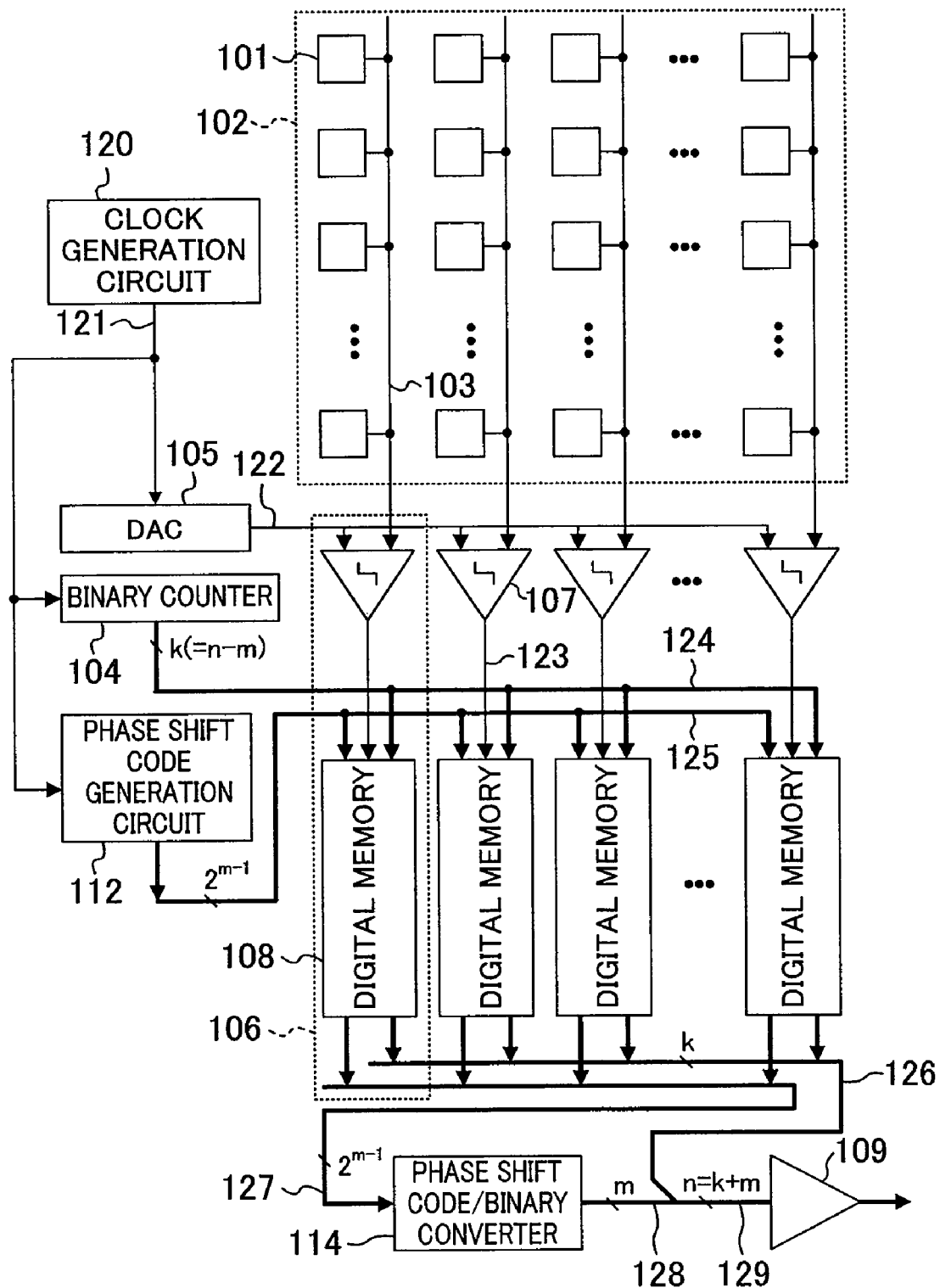
FIG. 23 is a block circuit diagram for showing the architecture of a MOS sensor according to Embodiment 7 of the invention.

FIG. 23 is a block circuit diagram for showing the architecture of a MOS sensor according to Embodiment 7 of the invention.

The MOS sensor of this embodiment is different from the MOS sensor of Embodiment 5 in a phase shift code generation circuit (a phase shift code outputting circuit) 112 provided instead of the binary/phase shift code converter 113 (see FIG. 19).

Also, the MOS sensor of this embodiment includes a DAC 105 not receiving a binary value as an input in the same manner as the MOS sensor of Embodiment 6.

Owing to these two differences, a merit that a binary counter 104 outputs merely a counter value corresponding to upper k bits alone and need not output a counter value corresponding to lower m bits can be attained. Also, not only the number of signal values can be reduced but also there is no need to output a counter value corresponding to a lower bit of a higher frequency, and therefore, noise can be effectively reduced.

The phase shift code generation circuit 112 is a circuit for receiving, as an input, a clock signal 121 output from a clock generation circuit 120 and generating a phase shift code 125. Specifically exemplified configurations of the phase shift code generation circuit 112 are one in which a phase delay between phase shift codes is caused by delaying the cycle of a received clock signal (described as a third configuration example below), and one in which a clock signal of the same frequency as a phase shift code to be generated is merely input (described as a fourth configuration example below).

Third Configuration Example of Phase Shift Code Generation Circuit

Figure 24A:
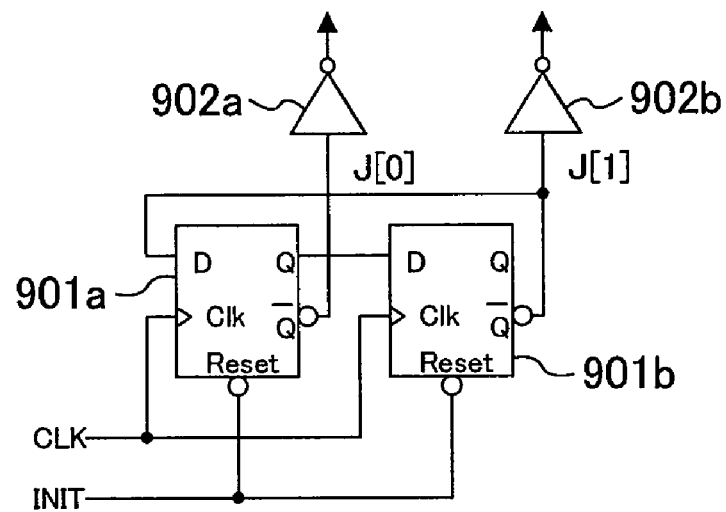
FIG. 24A is a circuit diagram of a phase shift code generation circuit of a third configuration example using a Johnson counter and FIG. 24B is a diagram for showing signal waveforms obtained in the phase shift code generation circuit of the third configuration example.
Figure 24B:
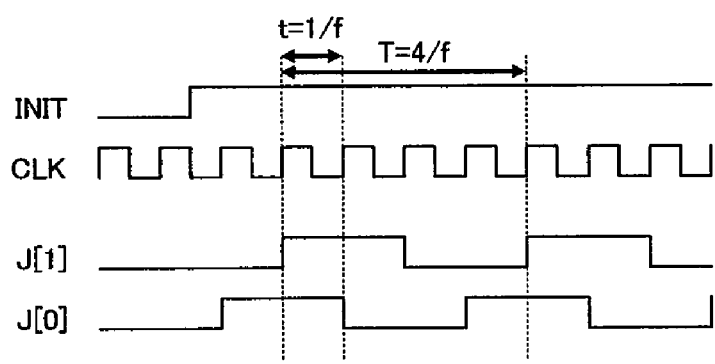
Figure 25A:
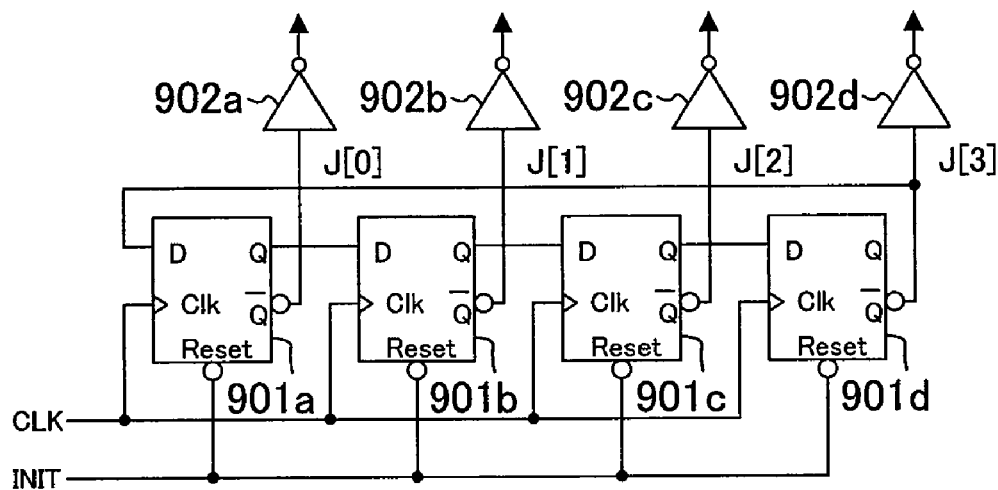
FIG. 25A is a circuit diagram of another phase shift code generation circuit of the third configuration example using a Johnson counter and FIG. 25B is a diagram for showing signal waveforms obtained in the phase shift code generation circuit of the third configuration example.
Figure 25B:
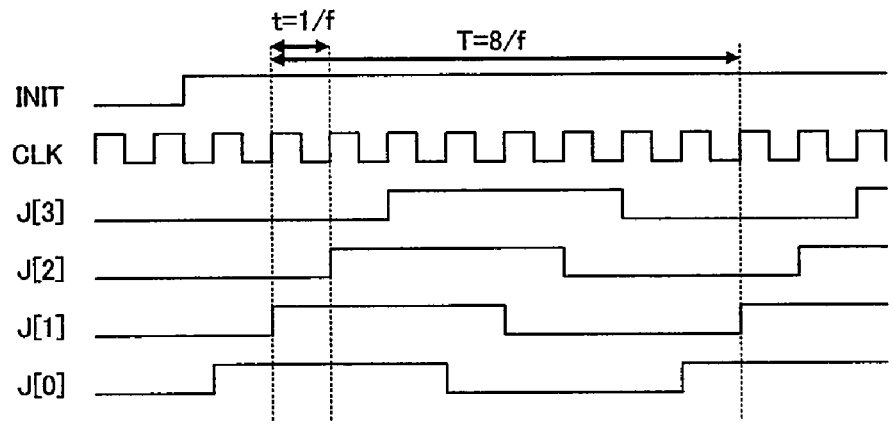

FIGS. 24A and 25A are circuit diagrams of a phase shift code generation circuit of the third configuration example using a Johnson counter, and FIGS. 24B and 25B are diagrams for showing signal waveforms obtained in the phase shift code generation circuit of the third configuration example. FIG. 24A shows a circuit diagram employed when the bit number m is 2 ($2^{m-1}=2$), and FIG. 25A shows a circuit diagram employed when the bit number m is 3 ($2^{m-1}=4$).

The phase shift code generation circuit shown in FIG. 24A includes D flip flops 901a and 901b both for receiving a clock signal CLK, an inverter 902a for outputting a signal J[0] and an inverter 902b for outputting a signal J[1]. An output of the D flip flop 901a disposed at the first stage is input to the D flip flop 901b disposed at the second stage, and an inverted output of the D flip flop 901b is input to the D flip flop 901a. In other words, the D flip flops 901a and 901b together form a loop. Also, an inverted output of the D flip flop 901a is input to the inverter 902a and an inverted output of the D flip flop 901b is input to the inverter 902b.

Owing to this configuration, a phase shift code J[1:0] in which the phase is shifted corresponding to the cycle of the clock signal CLK from the initial state of all zeros can be generated as shown in FIG. 24B.

Furthermore, when D flip flops 901a, 901b, 901c and 901d of four stages are serially connected to one another in the same manner as in a general shift register and an inverted output of the D flip flop 901d disposed at the final stage is input to the D flip flop 901a disposed at the first stage as shown in FIG. 25A, inverters 902a, 902b, 902c and 902d can respectively output signals J[0], J[1], J[2] and J[3] shifted in phase from each other corresponding to the cycle of the clock signal CLK. In other words, when the configuration of FIG. 25A is employed, a phase shift code J[3:0] in which the phase is shifted corresponding to the cycle of the clock signal CLK from the initial state of all zeros can be generated as shown in FIG. 25B.

In the Johnson counter of the third configuration example, it is necessary to input a clock signal of a high frequency (which is shown as the clock signal CLK in FIGS. 24A and 25A and as the clock signal 121 in FIG. 23) for driving the counter. However, input load to the phase shift code generation circuit is small differently from clock distribution to digital memories of the respective columns, and hence, even when a clock signal of a high frequency is supplied to the phase shift code generation circuit, a problem of rounding of the clock signal or the like does not occur. Therefore, when the third configuration example is employed, a phase shift code can be generated without causing the problem of waveform rounding or the like.

The phase shift code generation circuit of FIG. 25A is used when the bit number is $2^{m-1}=4$, and in the case where this circuit is included in the MOS sensor described in Embodiment 7, the maximum frequency of the signal can be lowered to ¼ of that attained in the AD conversion performed by using a binary code alone and lowered to ½ of that attained in the AD conversion performed by using a Gray code alone. Alternatively, in the case where a clock signal of the same frequency as in an AD conversion circuit using a Gray code alone is used, the accuracy is improved by 2 bits as compared with the case where a binary code alone is used and by 1 bit as compared with the case where a Gray code alone is used.

Although the configurations of the phase shift code generation circuit employed when the bit number m is 2 and 3 are described above, a phase shift code generation circuit applicable to an arbitrary bit width can be obtained by serially connecting D flip flops in the number corresponding to $2^{m-1}$, wherein m is a necessary bit number, and allowing an inverted output of the D flip flop disposed at the final stage to be input to the D flip flop disposed at the first stage.

Alternatively, a phase shift code generation circuit can be constructed by connecting flip flops other than the D flip flops in the aforementioned manner.

Fourth Configuration Example of Phase Shift Code Generation Circuit

When the frequency is very high, it is difficult to generate a fast clock due to the restriction in device performance and the like rather than the problem of the waveform rounding caused in distributing a clock signal. As a countermeasure, the frequency of an input clock signal can be suppressed to the same frequency level as a phase shift code generated by a phase shift code generation circuit by using a delay-locked loop circuit (hereinafter referred to as a DLL).

Figure 26A:
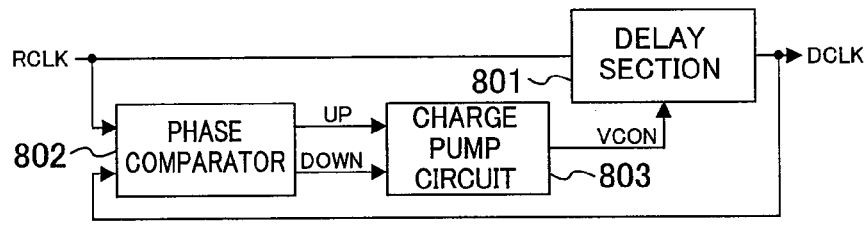
FIGS. 26A and 26B are diagrams of a phase shift code generation circuit of a fourth configuration example using a DLL.
Figure 26B:
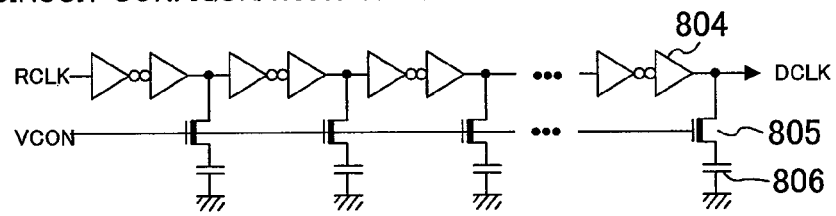

FIGS. 26A and 26B are diagrams of a phase shift code generation circuit of the fourth configuration example using a DLL.

The phase shift code generation circuit of the fourth configuration example shown in FIG. 26A includes a phase comparator 802, a charge pumping circuit 803 and a delay section 801. In this configuration example, a clock signal RCLK input to the phase comparator 802 is delayed by the delay section 801 so as to be output as a signal DCLK. Specifically, the phase comparator 802 compares the signals RCLK and DCLK and generates an up or down signal corresponding to delay therebetween so that the delay can be just one cycle. The charge pumping circuit 803 receives the up or down signal from the phase comparator 802 so as to generate a voltage signal VCON in accordance with the received signal.

The delay section 801 is a circuit in which a capacity 806 is added as a load through an NMOS transistor switch (hereinafter referred to as the MOS switch) 805 to an inverter chain including inverters 804 connected in multiple stages as shown in FIG. 26B. The voltage signal VCON is used for controlling the gate potential of the MOS switch 805 connected to the capacity 806. When the voltage signal VCON is increased, the on resistance of the MOS switch 805 is lowered, the capacity is increased as the load and the delay is increased. On the contrary, when the voltage signal VCON is reduced, the on resistance of the MOS switch 805 is increased, the capacity is reduced as the load and the delay is reduced.

Figure 27:
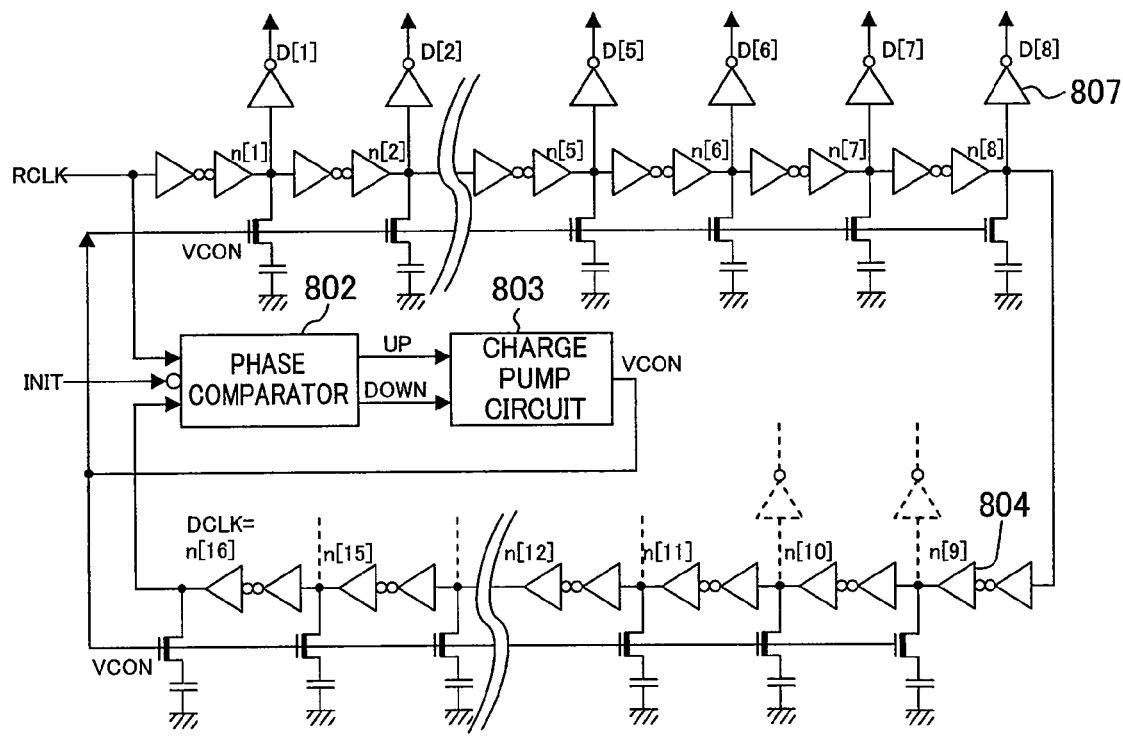
FIG. 27 is a diagram for showing an exemplified configuration of a phase shift code generation circuit for outputting signals shifted in phase by π/8 utilizing the circuit configuration of the DLL shown in FIGS. 26A and 26B.

FIG. 27 is a diagram for showing an exemplified configuration of a phase shift code generation circuit for outputting signals shifted in phase by $\pi/2^{m-1}$ by utilizing the circuit configuration of the DLL shown in FIGS. 26A and 26B.

As shown in FIG. 27, owing to the function of the DLL for adjusting the phases of an original clock signal RCLK and a delayed clock signal DCLK obtained through 16 delaying stages, clock signals n[1], n[2], ..., n[15] and n[16] (=delayed clock signals DCLK) delayed corresponding to 1/16 of one cycle in each delaying stage (i.e., with phase delay of $\pi/8$) can be obtained. When the clock signals are taken out from adjacent 8 nodes (for example, signals D[1] through D[8] resulting from buffering the signals n[1] through n[8] by clock buffers 807 are taken out), the circuit shown in FIG. 27 can be used as a phase shift code generation circuit. It is noted that there is no need to take out the clock signals n[9] through n[16] from the corresponding nodes but these nodes are preferably provided with buffers for improving the timing accuracy by equalizing the load in the respective delaying stages.

The phase shift code generation circuit of the fourth configuration example for generating a phase shift code of a given bit width has been described, and a phase shift code of a different bit width can be easily generated by changing the number of stages of shift registers included in the phase shift code generation circuit or the number of delaying stages of the DLL.

The phase shift code generation circuit shown in FIG. 27 is used when the bit width m is 4, and when this phase shift code generation circuit is included in the MOS sensor described in Embodiment 7, the maximum frequency of the signal can be lowered to 1/8 of that attained in the AD conversion performed by using a binary code alone and lowered to 1/4 of that attained in the AD conversion performed by using a Gray code alone. Alternatively, in the case where a clock signal of the same frequency is used, the accuracy is improved by 3 bits as compared with the case where a binary code alone is used and by 2 bits as compared with the case where a Gray code alone is used.

When such a phase shift code generation circuit using a Johnson counter is included in the MOS sensor of Embodiment 7 of the invention, there is no need to require an excessively abrupt rising/falling characteristic of a clock signal or a counter value signal to be distributed to column AD conversion circuits or the like with large RC load.

Furthermore, when a phase shift code generation circuit using a DLL is included, the design specifications can be relaxed in such a manner that there is no need to generate a clock signal of GHz class not only as a (clock) signal to be distributed to the column AD conversion circuits of the respective columns but also as a clock signal generated by the clock generation circuit. Therefore, there is no need to forcedly employ fast CMOS process, which has a characteristic not always compatible with high picture quality process indispensable for an imaging device (a solid state imaging device). Moreover, an effect to reduce noise and electromagnetic radiation within the imaging device can be attained as the imaging system.

FIGS. 28A and 28B are diagrams for showing exemplified configurations of the $2^{m-1}$-bit phase shift code/binary converter. FIG. 28A shows the configuration employed when the bit width m is 2 and FIG. 28B shows the configuration employed when the bit width m is 3.

As shown in FIG. 28A, when the bit width m is 2, data values PS[0] and PS[1] of a phase shift code input to the phase shift code/binary converter are both input to an exclusive OR circuit 905 to be converted into a data value BIN[0] of a binary code. Also, the data values PS[1] corresponding to the most significant bit of the phase shift code is directly output as the most significant bit BIN[1] of the binary code.

Alternatively, as shown in FIG. 28B, when the bit width m is 3, three exclusive OR circuits 905 are provided, so that data values PS[0] and PS[2] can be input to the exclusive OR circuit 905a of the first stage and data values PS[1] and PS[3] can be input to the other exclusive OR circuit 905b of the first stage. Outputs of the exclusive OR circuits 905a and 905b are input to the exclusive OR circuit 905c of the second stage, so as to output the least significant bit BIN[0] of a binary code from the exclusive OR circuit 905c. A data value BIN[1] of the binary value is output from the exclusive OR circuit 905b, and the most significant bit PS[3] of the phase shift code is directly output as the most significant bit BIN[2] of the binary code. Thus, the conversion from a phase shift code to a binary code can be easily performed through a combination of exclusive OR circuits.

The present invention is applicable to a solid state imaging device including a column AD conversion circuit in which a conversion counter counts clocks supplied from a clock generation circuit provided outside the column so as to perform the AD conversion by holding a current counter value (namely, stopping the counting) when an output of a comparator is inverted. Also in this case, the AD conversion frequency can be lowered or the bit accuracy can be improved in the same manner by additionally providing a digital memory used for a phase shift code for lower bits.

Embodiment 8

Figure 29:
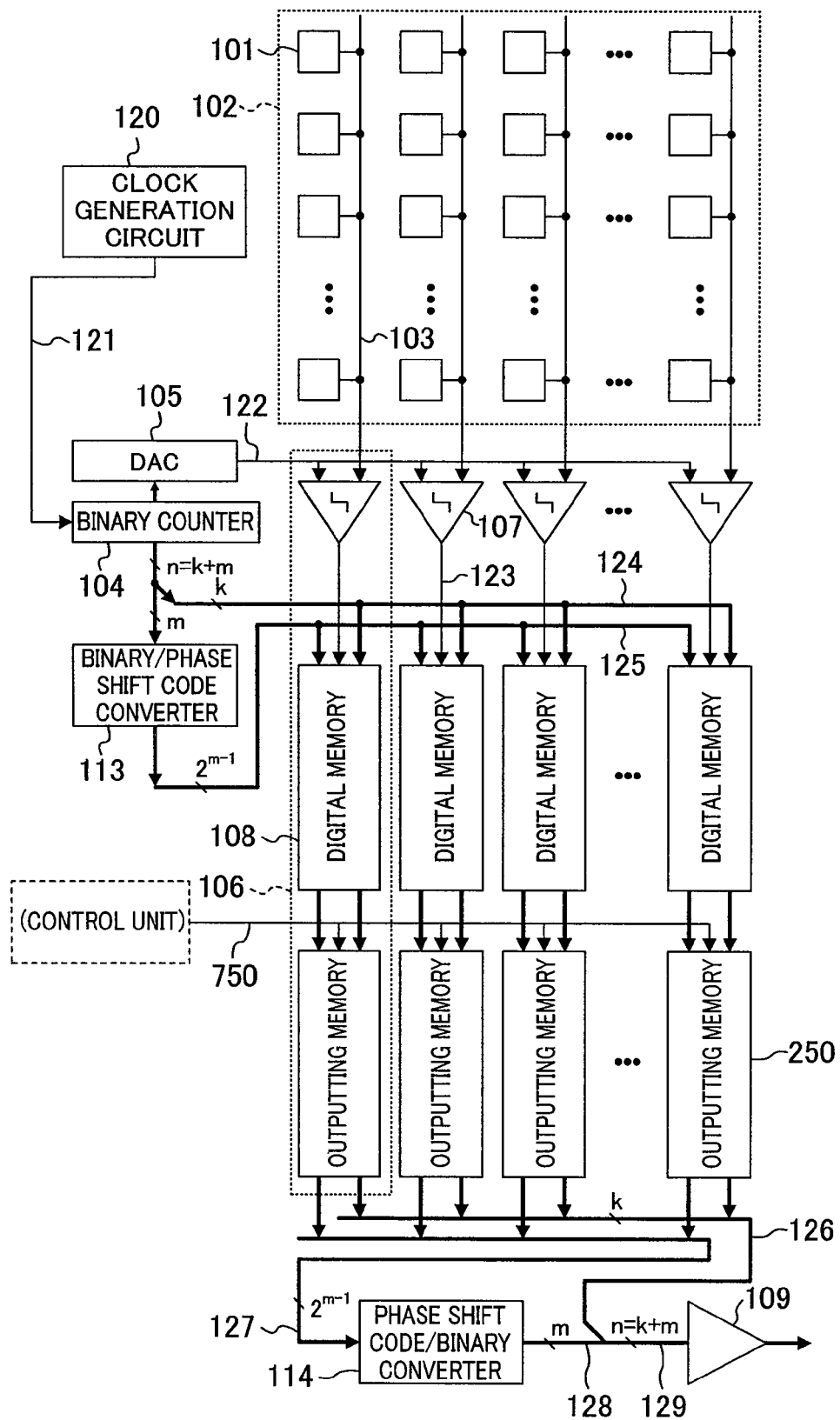
FIG. 29 is a block circuit diagram for showing the architecture of a MOS sensor according to Embodiment 8 of the invention.

FIG. 29 is a block circuit diagram for showing the architecture of a MOS sensor according to Embodiment 8 of the invention.

As shown in FIG. 29, the MOS sensor of this embodiment further includes, in a column AD conversion circuit 106 of each column, an outputting memory 250 for copying data of upper k bits and data of lower m bits held by a digital memory 108. The AD conversion of all the columns is performed in parallel, and after completing, for example, comparison in the whole input range for the AD conversion (or counting corresponding digital values), data values are copied simultaneously in accordance with a control signal commonly used in all the columns.

In this case, an AD converted value held by the digital memory 108 when the AD conversion of pixel signals of one row is completed is copied in the outputting memory 250 by driving a control line 750. The respective columns of the outputting memories 250 are successively selected by a column scanning circuit (not shown) so as to read the signals to output data buses 126 and 127, and at the same time, the AD conversion of pixels of the next row is performed. In this manner, the outputting processing is executed in parallel to the AD conversion, so as to rapidly output AD converted pixel signals corresponding to one screen.

It is noted that the outputting memory 250 can be constructed by using a plurality of latches or the like.

Although the outputting memory is additionally provided in the column AD conversion circuit 106 of Embodiment 5 shown in FIG. 19 in the architecture of FIG. 29, the outputting memory may be additionally provided in any of the column AD conversion circuits described in other embodiments.

As described so far, the solid state imaging device and the driving method of this invention are useful for an imaging device for detecting any of various physical quantity distributions of light, radiant rays and the like.

What is claimed is:

1. A physical quantity detecting apparatus comprising:
a sensitive element array in which sensitive elements for detecting physical quantity are arranged in the form of a matrix having columns;
a plurality of column AD conversion circuits, each of which is provided corresponding to at least one of the columns of the sensitive elements, for converting a signal output from each of sensitive elements of said at least one of the columns into a digital signal;
an output signal bus for transferring the digital signal output from the plurality of column AD conversion circuits;
a clock generation circuit for supplying a counter clock signal and a latch clock signal to the plurality of column AD conversion circuits; and
a DA converter for outputting a triangle wave,
each of the column AD conversion circuits including:
a comparator for comparing the signal output from each of the sensitive elements in a given period with potential of the triangle wave;
a column counter for counting pulses of the counter clock signal and holding a counter value obtained when an output of the comparator is changed; and
one or plural latches for receiving the latch clock signal and holding a value of the latch clock signal obtained when the output of the comparator is changed, and
the digital signal with amplitude in accordance with an AD converted value expressed through a combination of the counter value held by the column counter and the value held by the one or plural latches being output to the output signal bus.

2. The physical quantity detecting apparatus of claim 1, wherein each of the sensitive elements is a pixel having a light receiving portion,
the sensitive element array is a pixel array, and
the physical quantity detecting apparatus is a solid state imaging device.

3. The physical quantity detecting apparatus of claim 1, wherein the latch clock signal includes s signals having different frequencies or s signals having the same frequency and different phases,
the latches are plural in number for respectively holding the s clock signals,
the value held by the latches expresses lower m bits (wherein m is a positive integer greater than one) of the AD converted value, and
$s=2^{(m-1)}$.

4. The physical quantity detecting apparatus of claim 3, wherein the counter clock signal has the same frequency as the latch clock signal.

5. The physical quantity detecting apparatus of claim 1, wherein each of the column AD conversion circuits further includes an outputting memory for copying the counter value held by the column counter and the value held by the one or plural latches, and
the physical quantity detecting apparatus further comprises a column selecting circuit for successively selecting AD converted values held by outputting memories of respective columns and outputting the selected AD converted values to the output signal bus.

6. The physical quantity detecting apparatus of claim 3, further comprising a phase shift code generation circuit for generating, from a clock signal with a frequency f output from the clock generation circuit, s signals having the frequency f and respectively shifted in phase by $\pi/s$ and for supplying the s signals to the latches.

7. The physical quantity detecting apparatus of claim 6, further comprising a phase shift code/binary converter for converting an output of the latches expressed by using a phase shift code into binary code expression.

8. The physical quantity detecting apparatus of claim 3, further comprising a phase shift code generation circuit for generating, from a clock signal with a frequency f output from the clock generation circuit, s signals having a frequency $f/(2s)$ and respectively shifted in phase by $\pi/s$ and for supplying the s signals to the latches.

9. The physical quantity detecting apparatus of claim 6, wherein the clock signal is input to the phase shift code generation circuit, and
the phase shift code generation circuit includes a DLL circuit containing a plurality of delaying stages for outputting the s signals having the same frequency and respectively shifted in phase by $\pi/s$.

10. The physical quantity detecting apparatus of claim 1, further comprising a binary counter for receiving the clock signal output from the clock generation circuit and for outputting a binary value to the DA converter,
wherein the DA converter outputs the triangle wave in accordance with the binary value input thereto.

11. The physical quantity detecting apparatus of claim 1, wherein the counter value of the column counter is changed at a rising edge or a falling edge of the counter clock signal.

12. The physical quantity detecting apparatus of claim 1, wherein the counter value of the column counter is changed at a rising edge of the counter clock signal, and the physical quantity detecting apparatus further includes a first inverter disposed between the clock generation circuit and the one or plural latches of each column or a second inverter for inverting an output signal from the one or plural latches of each column.

13. The physical quantity detecting apparatus of claim 1, wherein the value held by the one or plural latches expresses, as a binary code, one or a plurality of bits on a least significant bit side of the AD converted value.

14. The physical quantity detecting apparatus of claim 1, wherein the column counter is an up/down counter that performs up-counting of an upper bit of a signal output from each of the sensitive elements and performs down-counting, in resetting, of the upper bit of the signal output from each of the sensitive elements, the one or plural latches include an up-counting latch for holding a lower bit of the signal output from each of the sensitive elements and a down-counting latch for holding, in resetting, the lower bit of the signal output from each of the sensitive elements, and an output of the up-counting latch, an output of the down-counting latch and a difference obtained by the column counter between a counter value of the up-counting and a counter value of the down-counting of every column are output to the output signal bus.

15. A driving method for a physical quantity detecting apparatus including a sensitive element array in which sensitive elements for detecting physical quantity are arranged in the form of a matrix having columns; a plurality of column AD conversion circuits, each of which includes a comparator, a column counter and one or plural latches and is provided corresponding to at least one of the columns of the sensitive elements for converting a signal output from each of sensitive elements of said at least one of the columns into a digital signal; an output signal bus for transferring the digital signal output from the plurality of column AD conversion circuits; a clock generation circuit for supplying a counter clock signal and s latch clock signals to at least one of the column AD conversion circuits where $s=2^{(m-1)}$, m being a positive integer greater than one; and a DA converter for outputting a triangle wave, the driving method comprising the steps of:

(a) comparing a potential of the signal read from each of the sensitive elements with a potential of the triangle wave by the comparator in at least one of the column AD conversion circuits;

(b) counting pulses of the counter clock signal by the column counter from start of comparison by the comparator;

(c) holding a counter value of the column counter with the counter clock signal to be input to the column counter masked when an output from the comparator is changed after the step (b);

(d) holding, by the one or plural latches, potentials of the s latch clock signals obtained when the output from the comparator is changed after the step (b); and (e) outputting a digital signal of a given voltage by said at least one of the column AD conversion circuits to the output signal bus, the digital signal being obtained on the basis of a value expressed by combining the value held by the one or plural latches in the step (d) as lower m bits with the counter value of the column counter held in the step (c).

16. The method for driving a physical quantity detecting apparatus of claim 15, wherein the physical quantity detecting apparatus further includes an outputting memory provided in each of the column AD conversion circuits and connected to output ports of the column counter and the one or plural latches; and a column selecting circuit, and after procedures of the steps (c) and (d) are executed on signals read from the sensitive elements of all the columns, digital signals of all the columns held by the column counters and the latches are copied in outputting memories in all the columns in the step (e), and the digital signals of all the columns are successively read out from the outputting memories to the output signal bus by the column selecting circuit in parallel to a procedure of the step (a) performed on a row subsequently selected in the sensitive element array.

* * * * *